(12) United States Patent
Pettersson et al.

(10) Patent No.: US 7,999,798 B2
(45) Date of Patent: *Aug. 16, 2011

(54) METHOD AND DEVICE FOR DECODING A POSITION-CODING PATTERN

(75) Inventors: Mats-Petter Pettersson, Lund (SE); Andreas Björklund, Lund (SE)

(73) Assignee: Anoto AB (SE)

( * ) Notice: Subject to any disclaimer, the term of this patent is extended or adjusted under 35 U.S.C. 154(b) by 1091 days.

This patent is subject to a terminal disclaimer.

(21) Appl. No.: 11/532,038

(22) Filed: Sep. 14, 2006

(65) Prior Publication Data

US 2007/0064818 A1 Mar. 22, 2007

Related U.S. Application Data

(62) Division of application No. 10/282,001, filed on Oct. 29, 2002, now Pat. No. 7,145,556.

(60) Provisional application No. 60/331,383, filed on Nov. 14, 2001.

(30) Foreign Application Priority Data

Oct. 29, 2001 (SE) ........................................ 0103589

(51) Int. Cl.
*G06F 3/033* (2006.01)
(52) U.S. Cl. ..................................... 345/179; 178/18.01
(58) Field of Classification Search .................. 345/17.9, 345/156–183; 178/18.01–20.04; 382/313–315; 235/494; 341/5
See application file for complete search history.

(56) References Cited

U.S. PATENT DOCUMENTS

| 4,502,252 A | 3/1985 | Iwabuchi |
| 4,506,252 A | 3/1985 | Jacoby et al. |
| 4,606,069 A | 8/1986 | Johnsen |
| 4,817,171 A | 3/1989 | Stentiford |
| 5,023,434 A | 6/1991 | Lanfer et al. |
| 5,051,736 A | 9/1991 | Bennett et al. |

(Continued)

FOREIGN PATENT DOCUMENTS

EP 0-094-867 11/1983

(Continued)

OTHER PUBLICATIONS

XP002328425: Dymetman and Copperman, Intelligent Paper, Xerox Research Center Europe; published in Apr. 1998.

(Continued)

*Primary Examiner* — Alexander Eisen
*Assistant Examiner* — Patrick Marinelli
(74) *Attorney, Agent, or Firm* — Finnegan, Henderson, Farabow, Garrett & Dunner LLP

(57) ABSTRACT

In a method for position decoding, a position is calculated on the basis of information determined from a partial area, imaged by a sensor, of a position-coding pattern. If the position calculation fails, the information from the partial area recorded by the sensor is matched with information about how the position-coding pattern is designed in a plurality of matching partial areas, which each define a position in the position-coding pattern. The position of the positions defined by the matching partial areas, which according to the matching step is the most probable position in the position-coding pattern for the imaged partial area is accepted as the decoded position. A device and a computer program for carrying out the method are also described.

42 Claims, 17 Drawing Sheets

U.S. PATENT DOCUMENTS

| | | | | |
|---|---|---|---|---|
| 5,221,833 | A | * | 6/1993 | Hecht .......................... 235/494 |
| 5,442,147 | A | * | 8/1995 | Burns et al. ................ 178/18.09 |
| 5,477,012 | A | | 12/1995 | Sekendur |
| 5,661,506 | A | | 8/1997 | Lazzouni et al. |
| 5,675,129 | A | | 10/1997 | Burns et al. |
| 5,852,434 | A | | 12/1998 | Sekendur |
| 5,937,110 | A | | 8/1999 | Petrie et al. |
| 6,208,771 | B1 | | 3/2001 | Jared et al. |
| 6,411,278 | B1 | | 6/2002 | Kage et al. |
| 6,548,768 | B1 | * | 4/2003 | Pettersson et al. ......... 178/18.01 |
| 6,570,104 | B1 | * | 5/2003 | Ericson et al. ............. 178/18.09 |
| 6,667,695 | B2 | * | 12/2003 | Pettersson et al. ................. 341/5 |
| 6,674,427 | B1 | * | 1/2004 | Pettersson et al. ........... 345/179 |
| 6,929,183 | B2 | | 8/2005 | Pettersson et al. |
| 6,966,495 | B2 | * | 11/2005 | Lynggaard et al. ...... 235/472.01 |
| 7,543,753 | B2 | | 6/2009 | Pettersson et al. |
| 2003/0056169 | A1 | | 3/2003 | Lapstun et al. |

FOREIGN PATENT DOCUMENTS

| | | |
|---|---|---|
| EP | 0 469 868 A2 | 7/1991 |
| EP | 0-984-390 | 3/2000 |
| JP | A-59-17675 | 1/1984 |
| JP | A-61-296421 | 12/1986 |
| JP | A-03-037707 | 2/1991 |
| JP | A-06-309084 | 4/1994 |
| JP | A-06-506080 | 7/1994 |
| JP | A-07-141104 | 6/1995 |
| JP | A-07-200141 | 8/1995 |
| JP | A-10-187912 | 7/1998 |
| JP | A-2000-099257 | 4/2000 |
| JP | T-2003-515847 | 5/2003 |
| WO | WO 92/17859 | 10/1992 |
| WO | WO-92/17859 A1 | 10/1992 |
| WO | WO 99/23604 | 5/1999 |
| WO | WO-00/73983 A1 | 12/2000 |
| WO | WO-01/26032 A1 | 4/2001 |
| WO | WO-01/26033 A1 | 4/2001 |
| WO | WO-01/26034 A1 | 4/2001 |
| WO | WO 0126032 A1 * | 4/2001 |
| WO | WO 01/41055 | 6/2001 |
| WO | WO-01/75783 A1 | 10/2001 |
| WO | PCT/SE02/01243 | 1/2002 |
| WO | PCT/SE02/01246 | 1/2002 |

OTHER PUBLICATIONS

English Translation of Notification of Reasons for Refusal in Japanese Patent Application No. 2003-507753, Dated Dec. 11, 2008 (8 pages).

U.S. Appl. No. 60/399,430, filed Dec. 14, 2001 (35 pages), priority document for U.S. Patent Nos. 7,543,753 and US-6,929,183).

U.S. Appl. No. 60/339,430, filed Dec. 14, 2001 (35 pages), priority document for U.S. Patent Nos. 7,543,753 and 6,929,183.

F. Jessie MacWilliams et al., "Pseudo-Random Sequences and Arrays," Proceedings of the IEEE, VI. 64, No. 12, Dec. 1976. pp. 1715-1730.

* cited by examiner

| Element value | $P_2$ | Bit comb. |
|---|---|---|
| "0" | 0,26 | 0,1 |
| "1" | 0,45 | 0,0 |
| "2" | 0,57 | 1,0 |
| "3" | 0,19 | 1,1 |
33
| | | | | | | |
|---|---|---|---|---|---|---|
| "0" | 0,26 | 0 | | "0" | 0,26 | 1 |
| "1" | 0,45 | 0 | | "1" | 0,45 | 0 |
| "2" | 0,57 | 1 | | "2" | 0,57 | 0 |
| "3" | 0,19 | 1 | | "3" | 0,19 | 1 |
33'  33''
*Fig. 15a*
max(0.26, 0.45) = 0.45
max(0.57, 0.19) = 0.57
max(0.45, 0.57) = 0.57
max(0.26, 0.19) = 0.26
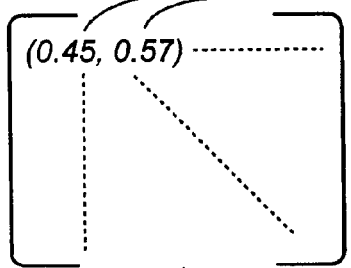  (0.45, 0.57)
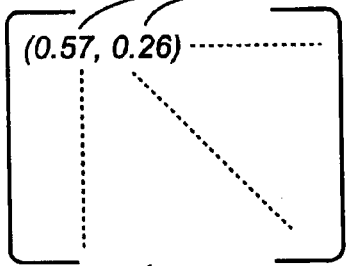  (0.57, 0.26)
34  35
*Fig. 15b*
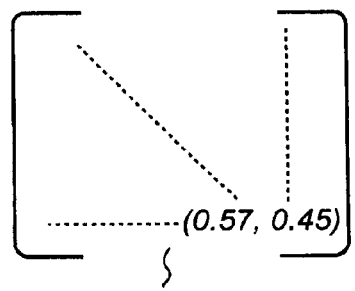  (0.57, 0.45)
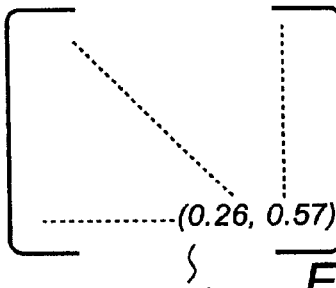  (0.26, 0.57)
34'  35'
*Fig. 15c*

| 36 | 37 | |
|---|---|---|
| 0 | 0.11, 0.37 | 0.11 |
| 1 | 0.08, 0.53 | 0.53 |
| 0 | 0.84, 0.57 | 0.84 |
| 0 | 0.21, 0.25 | 0.21 |
| 1 | 0.62, 0.91 | 0.91 |
| 1 | 0.38, 0.06 | 0.06 |
| 0 | 0.64, 0.42 | 0.64 |
| 1 | 0.04, 0.17 | 0.17 |

$= 6{,}11 \cdot 10^{-5}$

$$46 \begin{bmatrix} (0.45, 0.27) & (0.31, 0.41) & (0.73, 0.09) \\ (0.36, 0.14) & (0.73, 0.09) & (0.16, 0.47) \\ (0.72, 0.09) & (0.55, 0.12) & (0.12, 0.55) \end{bmatrix}$$

$$47 \begin{bmatrix} (0.45, 0.15) & (0.15, 0.41) & (0.11, 0.73) \\ (0.36, 0.36) & (0.73, 0.11) & (0.47, 0.24) \\ (0.12, 0.72) & (0.55, 0.22) & (0.22, 0.55) \end{bmatrix}$$

$$48 \begin{bmatrix} (0.55, 0.12) & (0.12, 0.55) & (0.09, 0.72) \\ (0.47, 0.16) & (0.09, 0.73) & (0.14, 0.36) \\ (0.09, 0.73) & (0.41, 0.31) & (0.27, 0.45) \end{bmatrix}$$

$$49 \begin{bmatrix} (0.55, 0.22) & (0.22, 0.55) & (0.72, 0.12) \\ (0.24, 0.47) & (0.11, 0.73) & (0.36, 0.36) \\ (0.73, 0.11) & (0.41, 0.15) & (0.15, 0.45) \end{bmatrix}$$

METHOD AND DEVICE FOR DECODING A POSITION-CODING PATTERN

RELATED APPLICATIONS

The present application is a Divisional of application Ser. No. 10/282,001 filed on Oct. 29, 2002 now U.S. Pat. No. 7,145,556 and for which priority is claimed under 35 U.S.C. §120; and this application claims priority of U.S. Provisional Application No. 60/331,383 filed on Nov. 14, 2001 under 35 U.S.C. §119; the entire contents of all are hereby incorporated by reference.

FIELD OF THE INVENTION

The present invention relates generally to decoding of position-coding patterns and, more specifically, a method for position decoding which comprises the step of calculating a position on the basis of information determined from a partial area, recorded by a sensor, of a position-coding pattern.

The invention also relates to a device, a computer program and a storage medium which can be used to decode a position-coding pattern.

BACKGROUND ART

There are position-coding patterns which have the property that the absolute position in the position-coding pattern for a partial area of the position-coding pattern of a smallest predetermined size can be calculated by means of the information in the partial area and a predetermined algorithm. Examples of such position-coding patterns are disclosed in U.S. Pat. No. 5,477,012 (O. Sekendur), where each position is coded by means of a symbol, and WO 92/17859 (Hewlett Packard Co.), WO 00/73983 (Anoto AB), WO 01/26033 (Anoto AB) and U.S. Pat. No. 5,973,110 (Xerox Corp), where each position is coded by means of a plurality of symbols.

Position-coding patterns of this type can be used, for instance, for digital recording of information which is written and/or drawn by hand by means of a user unit on a base provided with the position-coding pattern. While moving the user unit, images of the position-coding pattern are continuously recorded locally at the tip of the user unit. One or more symbols in each of the images are decoded to a position. The decoded positions together constitute a digital description of the user unit's movement over the base.

As long as the position-coding pattern is perfectly reproduced on the base and as long as the position-coding pattern is perfectly imaged in the recorded images, the position decoding can be expected to function very well. In practice, however, there is a risk of the position-coding pattern being distorted more or less when being applied to the base. It also happens that the user unit does not image the position-coding pattern perfectly owing to defects in the user unit's imaging system and because the user tilts the user unit when writing and the position-coding pattern thus is imaged in perspective. This can in turn result in incorrect positions being decoded from the position-coding pattern.

Incorrectly decoded positions can be discovered if the position-coding pattern contains redundant information which enables error detection. They can also be discovered if the distance to previously and/or subsequently decoded positions is unreasonable.

If an incorrectly decoded position is detected, it can be either retained or rejected. If the position is retained, the digitally recorded positions will not correctly represent the user unit's movement over the base. If the incorrectly decoded position is instead rejected, there will be a "gap" in the digitally recorded positions. Many such gaps can obstruct the possibility of interpreting what has been written on the base.

SUMMARY OF THE INVENTION

A general object of the invention is to solve this problem and thus improve the quality of the digital representation of the information generated on the position-coded base.

A specific object is to increase the number of positions that can be decoded correctly from images of the position-coding pattern.

One more specific object is to increase the number of correctly decoded positions without inappropriately increasing the time needed for decoding.

Another specific object is to increase the number of correctly decoded positions without inappropriately increasing the need for memory space and/or processor capacity for decoding.

These and other objects that will be evident from the following description are achieved wholly or partly by means of a method, a computer program, a storage medium and a device according to the appended claims.

According to a first aspect, the invention relates more specifically to a method for position decoding, comprising the step of calculating a position on the basis of information determined from a partial area, imaged by a sensor, of a position-coding pattern. The method further comprises the steps of, if the calculation of the position fails, matching the information from the partial area imaged by the sensor with information about how the position-coding pattern is designed in a plurality of matching partial areas which each define a position in the position-coding pattern, and accepting the position of the positions defined by the matching partial areas which according to the matching step is the most probable position in the position-coding pattern for the imaged partial area.

By matching being carried out when the calculation of the position fails, a position is obtained, which in most cases better reflects the sensor's position when imaging the partial area than the position that is possibly obtained through the failed calculation. Moreover, gaps in the digital representation are avoided.

Matching can take place immediately when the position calculation has failed. Alternatively, it can be made at a later stage when more position information has been recorded, which can simplify matching.

The position calculation can fail, for instance, owing to partial results or the final result in the calculation being obviously incorrect. Partial results can be obviously incorrect when they contain values that should not be obtained in decoding of the position-coding pattern. The final result can be obviously incorrect if the decoded position is not located within a certain distance in terms of time from the immediately preceding or succeeding correctly decoded position or if the final result is considered to be far too unreliable.

It should here be pointed out that the partial area imaged by the sensor can be of a larger size than the matching partial areas and in particular can comprise more information than is strictly necessary to enable calculation of a position.

Matching can be carried out with all conceivable partial areas in the position-coding pattern which define a position. If the position-coding pattern is large, the matching can, however, be time-consuming. Instead, the matching can be restricted so as to be carried out merely in a limited matching area adjacent to a previously accepted position since the position to be determined is most probably located relatively close to a previously accepted position. If there are several accepted positions which are based on partial areas which have been imaged in terms of time close to the partial area for which the position calculation failed, more than one accepted position can, of course, be used to define the limited matching area.

The size of the limited matching area can be predetermined or determined dynamically, for instance with the aid of the speed and/or acceleration of the sensor before and/or after the imaging of the partial area for which the position calculation failed.

If it is assumed that the partial area for the failed position calculation can be expected to be positioned within a distance d from the previously accepted position, where d is the distance between positions or symbols in the position-coding pattern, information in the partial area for the failed position calculation must be matched with information from $(2d+1)^2$ partial areas in the position-coding pattern. If the matching is instead carried out in one dimension at a time in the position-coding pattern, the information in the partial area for the failed position calculation only has to be matched with information from $2(2d+1)$ partial areas instead. This requires, however, that the positions can be decoded separately in the different dimensions in the position-coding pattern. It should also be emphasized that the matching need not be carried out in all dimensions. If the position calculation succeeds in one dimension but fails in another, it is sufficient for the matching to be carried out in the dimension for which the position calculation has failed.

The position-coding pattern can be designed so that each position is coded by means of a plurality of elements, which can each assume at least two different values. In matching, the imaged partial area is then compared with the matching partial areas at element level and a measure of the probability that the elements assume the same values in the two matched partial areas is determined.

The measure of the probability can, for instance, consist of the number of corresponding element values. As another example, the information from the imaged partial area can consist of a set of probability values. More specifically, each probability value in the set can indicate a probability that one of the elements of the imaged partial area assumes one of the possible values. The set of probability values can comprise a probability value for each of the possible values of each element or the probability values of merely certain elements and values. The measure of the probability is determined on the basis of the probability values for the values which the elements of the matching partial area assume. If the elements of the matching partial area assume a certain combination of values which are known owing to the composition of the position-coding pattern being known, for instance the probability values for the values of the corresponding elements can be multiplied for determining the combined probability that the elements in the imaged partial area assume these values. By the matching being based on probability values for the elements that are determined from the imaged partial area, the information in this will be used to a greater extent than if only the element values for the partial area are determined.

The above-mentioned elements can, for example, correspond to the symbols of which the position-coding pattern is composed and which are imaged by the sensor when using the position-coding pattern. The elements can also correspond to information at a higher or processed level. The symbols can, for example, be divided into groups where each group constitutes an element which can assume different values depending on the values for the symbols in the group. Moreover, elements can be defined by two or more groups jointly. The imaged partial area thus need not be matched with the matching partial areas with the same resolution that is found in the position-coding pattern, which can save both time in matching and memory space when information from imaged partial areas is to be saved awaiting matching.

Additional optimizations of the matching can be made by not matching all available information.

After carrying out the matching, the position accepted based on the imaged partial area can be verified by means of the information from the imaged partial area, which as a rule contains more information than is necessary for the position calculation/matching. The verifying step can be advantageous since the matching always results in a position. If the matching area is selected adjacent to a previously accepted position, the distance to this position cannot be used to determine the position obtained by the matching, and then it may be advantageous to verify the position by means of the additional information that is available in the imaged partial area. The verification can advantageously be made by means of probability calculations.

The above-described method for position decoding can advantageously be used together with the position-coding pattern that has been developed by Anoto AB and is described in for instance WO 01/26033. A variant of this pattern is described in Appendix A in the present application. The position-coding pattern has precisely the property that a position can be decoded separately in each dimension in the position-coding pattern.

The above method can be accomplished in hardware or software. Thus, the invention also relates to a computer program, which comprises program code which, when executed in a computer, causes the computer to carry out a method according to any one of the method claims.

The computer program can be executed by a processor which is arranged in the same unit as the sensor that images the partial area for which a position is to be decoded or in another unit.

The computer program can be stored in and distributed in the form of a storage medium, such as a RAM, a ROM, an optical disk, a magnetic tape or some other commercially available storage medium.

According to one more aspect, the invention concerns a device which comprises a signal-processing unit, which is adapted to calculate a position on the basis of information determined from a partial area, imaged by a sensor, of a position-coding pattern. The signal-processing unit is further adapted to match, if the calculation of the position fails, the information from the partial area imaged by the sensor with information about how the position-coding pattern is designed in a plurality of matching partial areas, which each define a position in the position-coding pattern, and to accept the position of the positions defined by the matching partial areas, which according to the matching step is the most probable position in the position-coding pattern for the imaged partial area.

The advantages of the device are evident from the above discussion of the method.

The signal processing unit may e.g. be realized by a suitably programmed processor, by specifically adapted hardware, such as an ASIC (Application-Specific Integrated Circuit) or an FPGA (Field Programmable Gate Array), by digital or analog circuits or any combination thereof. The signal processing unit thus have means for carrying out each one of the steps of the decoding method.

BRIEF DESCRIPTION OF THE DRAWINGS

The present invention will now be described in more detail by way of embodiments with reference to the accompanying drawings, in which

FIG. 11b is an enlargement of part of the position-coding pattern in FIG. 11a;

FIGS. 15a-c illustrate the creation of a first and a second matrix;

FIG. 16 shows a cyclic main number sequence

FIG. 17 illustrates the calculation of a sequence probability;

DETAILED DESCRIPTION OF EMBODIMENTS

Figure 1:
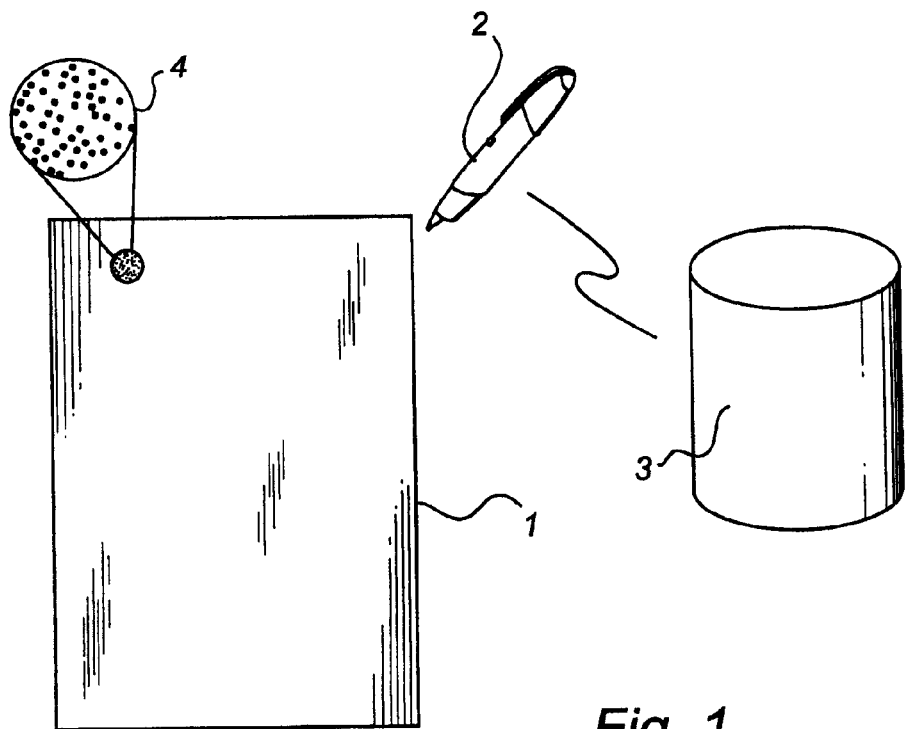
FIG. 1 is a schematic view of a system in which the invention can be used.

FIG. 1 schematically shows a system for information management, in which the present invention can be used. The system comprises a base 1 in the form of a sheet of paper, a user unit 2 and an external unit 3. The sheet of paper is provided with a position-coding pattern 4 of which only a small part is schematically indicated in an enlarged state. The user unit 2 can be used to write on the sheet of paper 1 in the same way as with an ordinary pen and to simultaneously record what is being written in digital form. The digitally recorded information can be processed in the user unit 2 and/or the external unit 3, to which it can be sent automatically (on-line) or when signaled by the user. For the digitally recorded information to correctly reflect that on the sheet of paper, it is important that the position decoding be made as correctly and completely as possible.

The position-coding pattern 4, which will be described in more detail below, is made up of graphical symbols, which are arranged or designed according to predetermined rules, which means that if a partial area of the position-coding pattern is correctly imaged, said partial area having a predetermined minimum size, the position of the partial area in the position-coding pattern can be determined unambiguously by means of one or more symbols in the imaged partial area and a predetermined decoding algorithm. The position can be obtained as a pair of coordinates in a Cartesian or another coordinate system.

When a user writes by means of the user unit 2 on the sheet of paper 1, the user unit will continuously record images of a partial area of the position-coding pattern at the tip of the user unit. Each image is decoded to a position. A sequence of such decoded positions then constitutes a digital representation of the user unit's 2 movement over the sheet of paper and thus of what is written on the sheet of paper.

The decoding of the position-coding pattern can take place in the user unit 2 or in the external unit 3 or in some other unit to which the images of the position-coding pattern are sent in a more or less processed form.

As mentioned above, the information in the partial area is decoded by means of a predetermined decoding algorithm. This functions well as long as the partial area is correctly imaged. Under actual conditions, however, the user unit often cannot image the partial area quite correctly, for instance owing to poor lighting conditions or the user holding the pen in an inclined position which causes the partial area to be imaged in perspective or the imaging mechanism deforming the image. It then happens that the decoding algorithm misinterprets a symbol or misses a symbol, which results in the position being incorrectly decoded. Errors can also arise if the position-coding pattern is not quite correctly reproduced on the sheet of paper but has been deformed to some extent when being applied to the sheet of paper. A position can also be considered incorrect, if, for some reason, it cannot be accepted, for example, by being considered far too unreliable.

Under certain conditions, errors can be discovered, for example, if the position-coding pattern contains redundant information which enables error detection or if the decoded position is unreasonable in relation to previously or subsequently decoded positions.

Figure 2:
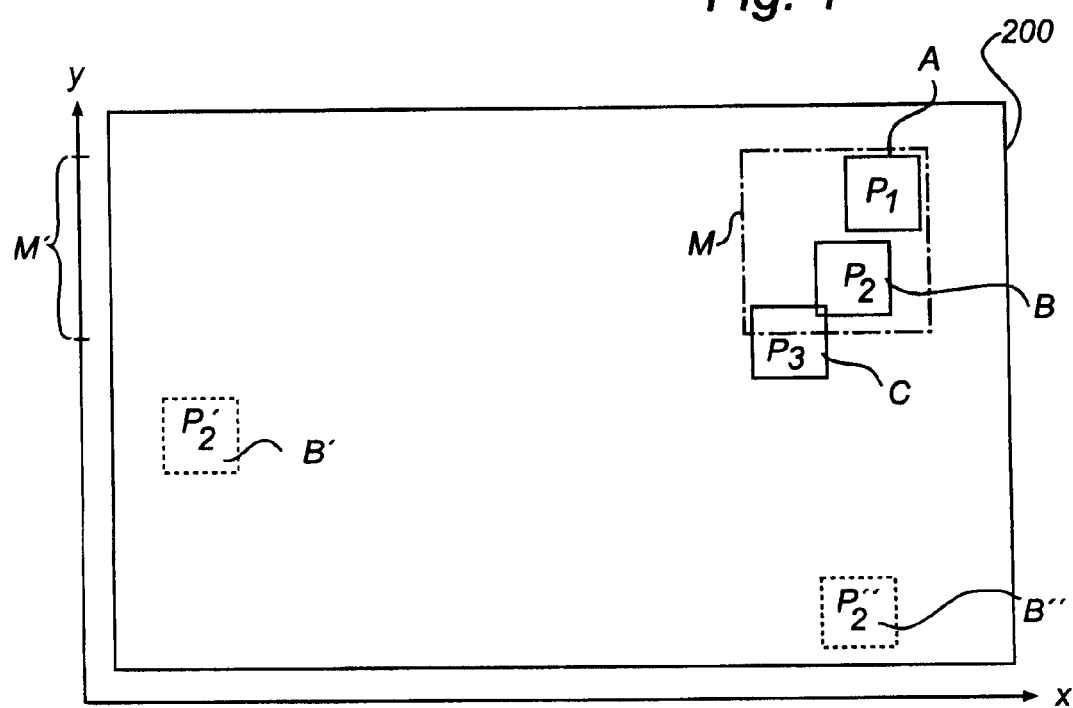
FIG. 2 illustrates schematically decoding and matching of partial areas on a sheet of paper.

FIG. 2 schematically shows how the problem with incorrectly decoded positions can be solved. A sheet of paper 200 is provided with a position-coding pattern, which for the sake of clarity is not shown in the Figure. A first partial area A codes a position P1 which has been decoded without any decoding error being detected and which therefore has been accepted as a correctly decoded position. A third partial area C codes a position P3 which has also been accepted as a correctly decoded position. After the user unit has imaged the partial area A and before it has imaged the partial area C, it has imaged the partial area B which has the position P2. Owing to a distorted image, the information in the partial area B has, however, been decoded to an incorrect position P2' which corresponds to the partial area B' which has been indicated by dashed lines.

Instead of rejecting the partial area B as unusable, a matching operation is carried out. The matching operation need not be carried out immediately, but may be carried out later, when one or more positions have been correctly decoded. In this example the decoding is carried out after the correct decoding of partial area C.

More particularly, information determined from the imaged partial area B is matched or compared with information about how the position-coding pattern is composed in different partial areas in a matching area M around the partial areas A and C. An example of in which area the matching can take place is given by the dash-dotted line. The area can be selected as a predetermined area or be selected dynamically. When selecting the matching area, one or more accepted positions can be taken into consideration, whose corresponding partial areas may have been recorded before and/or after the partial area for which the position calculation failed. In particular, the speed and acceleration of the user unit before and/or after the recording of the partial area for which the position calculation failed can be determined and used as a base for an assessment of the matching area.

Matching can take place in one or two dimensions. Depending on the composition of the position-coding pattern, the position decoding can in some cases be carried out separately for each dimension. It may then happen that the position calculation succeeds in a first dimension and results in an accepted position for this dimension, but the position calculation in the second dimension fails and results in a position in the second dimension which is obviously incorrect. In most cases, the matching then only has to take place in the incorrect dimension.

Assume, for instance, in FIG. 2 that the calculation of the x coordinate of the position P2 has succeeded and only the calculation of the y coordinate has failed, so that a position P2" corresponding to the partial area B" is obtained. The incorrect position in the y direction is detected since it is located too far away from the accepted positions P1 and P3. The information in the imaged partial area B then need only be matched with information from different partial areas with a varying y coordinate in the range M'.

Matching is thus carried out between on the one hand information which originates from an imaged partial area and which therefore is not always 100% correct and, on the other hand, known information about the appearance of the position-coding pattern in different matching partial areas. In each matching of an imaged partial area with a matching partial area, a probability is determined for the imaged partial area to image the matching partial area. When all matching partial areas in the matching area have been matched, the position is chosen, which corresponds to the matching partial area for which the greatest matching probability has been obtained.

Of course, it is desirable for the matching to be as quick as possible so that the digital recording of what is being written on the sheet of paper can be made in real time and the matching will require as little processor capacity and memory space as possible. The latter is especially desirable when the matching operation is carried out in the user unit which normally can be expected to have limited processor capacity and limited memory space. It is therefore desirable to optimize matching in various ways.

In the example above, the incorrect positions P2' and P2" are positions on the paper. They can however also be positions that are not on the paper.

It should furthermore be pointed out that in FIG. 2 the sizes of the partial areas relative to the sheet of paper are for the sake of clarity greatly enlarged relative to a practical embodiment.

Figure 3:
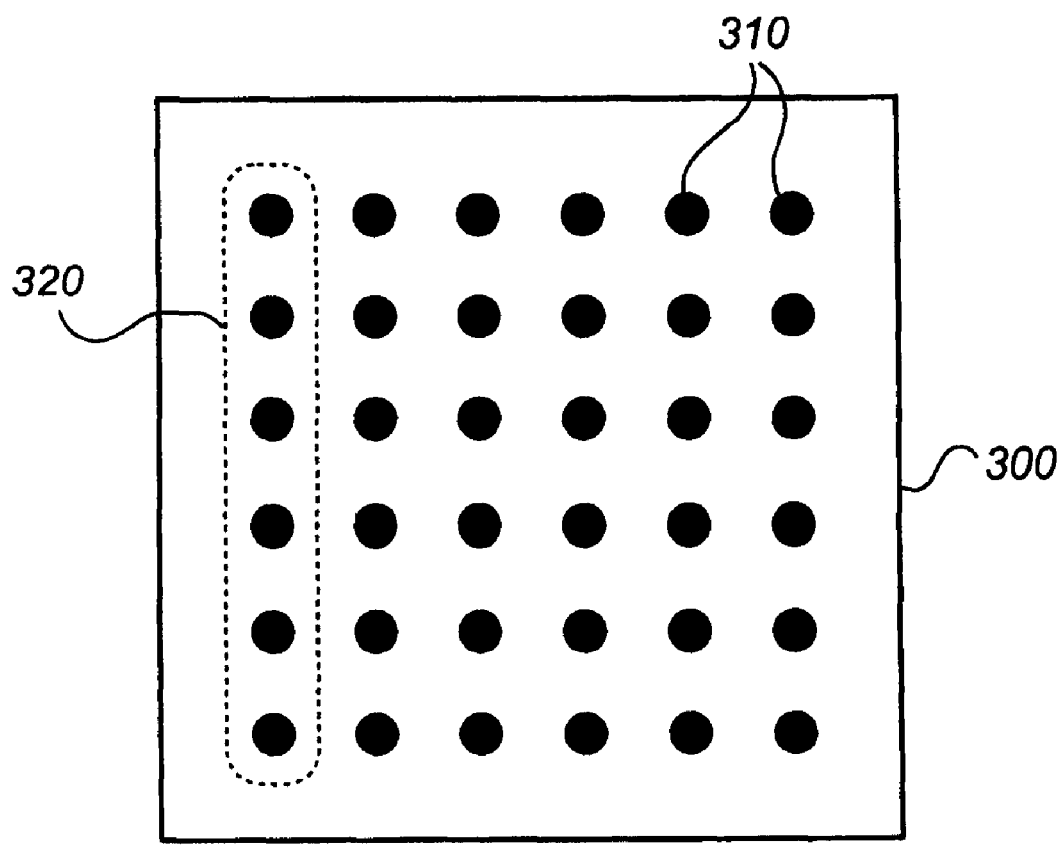
FIG. 3 shows schematically a partial area with symbols.

FIG. 3 shows an example of a partial area 300 which codes a position and which contains 6*6 symbols which are each schematically illustrated with a dot 310. For the sake of clarity, different values of the symbols are not shown, but all symbols are shown with the same dot. Each symbol can assume a predetermined number of different values, for instance "0" and "1". The value of the symbol can be coded by means of different parameters, such as the size of the dot, the location of the dot or the shape of the dot. It goes without saying that partial areas with a different number of symbols can be used.

The matching of the partial area 300 with a partial area of known content can take place at different levels. For instance, it can take place at the symbol level. In this case, each symbol value determined from the partial area 300 can be compared with the corresponding symbol value in the partial area of known content and the number of correct symbol values can be used as an indication of the probability that the partial area 300 corresponds to the partial area of known content. Alternatively, when decoding the values for the symbols in the partial area 300, a probability can be determined that each symbol assumes each of the possible values, for instance "0" and "1". For each matched partial area, the combined probability that the symbols in the partial area 300 assume precisely the combination of values in the matching partial area can be determined. The position of the matching partial area with the greatest combined probability is selected as the decoded position for the partial area 300.

The matching can alternatively be made at a "higher" level. The symbols can be arranged in groups, for instance in column or row vectors, and a vector value can be determined for each vector. FIG. 3 shows an example of a group designated 320. Instead of symbol values, group values or vector values can thus be compared in each partial area matching, which results in fewer comparisons for each partial area. Similarly to the matching at the symbol level, it is also possible to determine the probability that each group/vector assumes each of its possible values and to determine the combined probability for each matched partial area. This means that fewer probabilities have to be combined in each partial area matching. The matching at group level also means simplifications as regards obtaining information about how the position-coding pattern is composed in the different matching partial areas since it is then sufficient to store or calculate group values instead of symbol values.

The matching can also be made with information that has been processed to a still greater degree from the imaged partial area. For example, information originating from two or more groups can be compared in the matching.

In the following, the position decoding will be exemplified and described in more detail with reference to a specific position-coding pattern which has been developed by the applicant and for which protection has been solicited, inter alia, by way of International Patent Application PCT/SE02/01243, which was not publicly available at the time of filing the present application. The position-coding pattern and the decoding thereof will be described in detail in Appendix A with reference to FIGS. 4-9. However, a brief and simplified description of the pattern follows below.

The position-coding is based on a number sequence which below is referred to as difference number sequence. This difference number sequence has the property that if one takes an arbitrary partial sequence of a predetermined length, for instance a partial sequence with five difference numbers, this partial sequence always has an unambiguously determined location in the difference number sequence. In other words, it appears only once in the difference number sequence and can thus be used for position determination. More specifically, the difference number sequence "runs" along the x axis as well as along the y axis of the position-coding pattern.

The actual position-coding pattern is made up of simple graphical symbols which can assume four different values, 0-3. Each symbol consists of a mark which, for instance, can have the shape of a dot and which can be displaced a distance in one of four different directions relative to a nominal position or raster point, see FIG. 6. The nominal position consists of an intersection between raster lines in an invisible raster. The value of the symbol is determined by the direction of the displacement. Each symbol value 0-3 can be converted into one bit which is used for coding an x coordinate and one bit which is used for coding a y coordinate, i.e. into the pairs of bits 0,0; 0,1; 1,0; and 1,1. Thus the coding is made separately in the x and y direction, but the graphical coding is made with a symbol which is common to the x and y bit.

Each position is coded by 6*6 symbols which can thus be converted into a 6*6 bit matrix for an x coordinate and a 6*6 bit matrix for a y coordinate for the position. If the x bit matrix is considered, this can be divided into six columns of six bits each. Each sequence of bits in a column constitutes a partial sequence in a 63-bit-long cyclic main number sequence which has the property that if a partial sequence having a length of six bits is selected, this has an unambiguously determined place in the main number sequence. The six columns can thus be converted into six position numbers or sequence values which correspond to six places in the main number sequence. Between these six position numbers, five difference numbers can be formed in pairs, which constitute a partial sequence of the difference number sequence and which thus have an unambiguously determined place in the same and, thus, an unambiguously determined place along the x axis. For a certain x coordinate, the position numbers will vary depending on the y coordinate. On the other hand, the difference numbers will be the same independently of the y coordinate since all the time the position numbers vary according to the main number sequence which is repeated cyclically in the columns in the entire position-coding pattern.

Correspondingly six rows in the y bit matrix define six position numbers in the main number sequence. These six position numbers define five difference numbers, which constitute a partial sequence of the difference numbers sequence and which thus have an unambiguously determined place along the y axis.

When the position-coding pattern is used, images of different parts of the position-coding pattern are recorded, as has been described above. As a rule, the images contain considerably more than 6*6 symbols. In fact, the decoding is normally based on the best 8*8 symbols in the image. The extra symbols are used, inter alia, for error detection and/or correction, which is described in more detail in Appendices A and B.

Since the position-coding pattern is not always perfectly reproduced on a surface and since the user unit sometimes deforms the position-coding pattern during imaging, it may be difficult to determine quite safely the displacements of the dots and, thus, the value of the symbols. In a practical embodiment, it is therefore possible to determine instead the probability that each symbol assumes each of the four different possible values. Thus the imaged partial area is decoded to a matrix with four probability values for each matrix element in the matrix, where each matrix element corresponds to a symbol. This matrix can, in turn, be divided into two matrices—one for the x coordinate and one for the y coordinate. Each of these two matrices contains two probability values for each matrix element in the matrix. One for the probability that the matrix element has the value "1" and one for the probability that the matrix element has the value "0". The processing of each image of the position-coding pattern thus results in two probability value matrices Px and Py. How these matrices can be determined is described in more detail in Appendix B with reference to FIGS. 10-19. Protection is solicited for the content of Appendix B in, inter alia, International Patent Application PCT/SE02/01246 which was not publicly available at the time of filing the present application.

In the following, position decoding based on the above-described Anoto position-coding pattern will be described with reference to the flow chart in FIG. 20. The position decoding is preferably carried out by means of a processor and suitable program code which can be available in the user unit 2 or the external unit 3 in FIG. 1 or in some other unit.

The input signal to the program code comprises the above-mentioned two probability value matrices Px and Py (corresponds to matrices 34 and 35 in FIG. 18), which thus relate to the x coordinate and the y coordinate respectively. Based on these probability matrices, an x position and a y position are calculated, step 1800. How this can be carried out is described in more detail in Appendices A and B. Briefly, for each of the matrices Px and Py, the most probable places in the main number sequence which the bit sequence in each column and row has, are determined. From the thus obtained places or position numbers (also referred to as "sequence values" in Appendix B), difference numbers are determined for the x and y direction respectively. The difference numbers form a partial sequence of the difference number sequence for the x direction and the y direction, respectively. The partial sequences each have an unambiguously determined location in the difference number sequence. The location can be determined in the manner described in Appendix A. The location of the x number sequence determines the x coordinate and the location of the y number sequence determines the y coordinate.

The coordinate calculation can result in three cases. Either the calculation of the two coordinates succeeds, 1801, or the calculation of one coordinate succeeds, 1802, but the calculation of the other coordinate fails, or else the calculation of both coordinates fails, 1803.

If no error is detected during the coordinate calculation, this is considered to have succeeded and the position is stored as an accepted position, step 1804. All the other information concerning the imaged partial area can then be rejected if no further checks of the position are to be made.

If the calculation of one coordinate fails, information about this coordinate is saved for use in matching, while the coordinate for which the calculation has succeeded is stored and the associated information is rejected, step 1805, if no further checks of the position are to be made.

If the calculation of the two coordinates fails, of course the information about the two coordinates is saved, step 1806.

The information saved can be the entire information on which the position calculation was based, i.e. the probability value matrix/matrices Px and/or Py, or this information in a more or less processed form. For example, the probability values that each column assumes each of the possible position numbers may be calculated and saved. Alternatively, for instance only the most probable combination of position numbers may be saved, optionally together with the associated probabilities. Different combinations or subsets of the above-mentioned information may also be saved.

The matching can take place immediately or later when more positions have been decoded.

Now assume that the calculation of the x coordinate has succeeded, but that the decoding of y coordinate has failed. The x coordinate has been saved as have also the probability values for all the conceivable position numbers defined by the rows in the y coordinate matrix.

When the matching is to be carried out, first the area in which the matching is to take place is determined, step 1807. Since the x coordinate in this case is known, the matching need only take place along the y axis. The range along the y axis can be determined based on a previously and a subsequently accepted y coordinate.

Then the actual matching takes place. Since the x coordinate is known, it is known for each y coordinate in the matching area to which position numbers the y coordinate corresponds. The probabilities stored for these position numbers are fetched from the memory and the combined probability is calculated as the product of the probabilities for the position numbers in question, step 1808. When the combined probability has been calculated for all y coordinates in the matching area, the y coordinate for which the greatest combined probability has been obtained is selected, step 1809. The previously stored x coordinate and the selected y coordinate are stored as an accepted position, step 1810, and all information saved for the matching is rejected if no further check of the position is to be made.

In an alternative embodiment, only the most probable position number for each row can be saved. In this case, the number of corresponding position numbers is compared for each y coordinate. The y coordinate for which the largest number of corresponding position numbers is obtained is selected. This embodiment has the advantage that the amount of information saved will be smaller. On the other hand, this results in a rougher measure of the probability that the imaged partial area corresponds to the matching partial area as regards the position in the y direction.

In yet another alternative embodiment, in addition to the most probable position numbers also the probabilities for these are saved. The most probable y coordinate can then be selected based on the number of corresponding position numbers, the combined probability for these and the combined probability for the non-corresponding position numbers.

If the position calculation fails for both coordinates, step 1803, for instance the most probable position number for each of the rows in the y coordinate matrix Py and the most probable position number for each of the columns in the x coordinate matrix Px are saved.

The matching is carried out for one coordinate at a time. Assume that the matching begins with the x coordinate. First the matching area is determined as a range along the x axis, step 1811. The size of the area can be determined with regard to the same parameters as mentioned above. Subsequently, the actual matching takes place, step 1812.

Since the y coordinate is not known in this case, the position numbers to which the different x coordinates correspond are not known, only the difference numbers. A conceivable matching strategy is to calculate the differences between the stored position numbers and match these with the differences for the different x coordinates in the matching area. Since an incorrect position number causes two incorrect differences, this is, however, not an optimal strategy.

Another conceivable solution would be to test all conceivable combinations of position numbers which give rise to the difference numbers for the matched x coordinate. For each combination of position numbers which matches the difference numbers, the probability values for the position numbers are selected and multiplied. The x coordinate for which the highest probability value is obtained is determined. This solution functions well, but requires many calculations and thus takes a long time. Moreover, it requires access to the probability values for all position numbers.

To optimize matching, the matching can instead be carried out by means of an algorithm which calculates how many position numbers correspond to at least one subsequent position number with respect to the difference numbers for the matched x coordinate, the position numbers being considered from the right to the left.

Assume that 8 position numbers $p_0$-$p_7$ are accessible, which have been determined from the imaged partial area. These are to be matched with seven difference numbers $s_0$-$s_6$, which constitute the partial sequence of difference numbers which codes the x coordinate with which the information from the imaged partial area is to be matched. The difference numbers can be determined by the composition of the position-coding pattern being known.

Then the algorithm functions as follows:

```
Numbermatch = 0
For k = 6 down to 0
    For i=0 to 6-k
        If p_{k+i+1}-p_k=sum(j=k:k+i) (s_j)
            Numbermatch=Numbermatch+1;
            Interrupt innermost loop;
        End
    End
End
```

When the algorithm has been executed, the variable Numbermatch contains the number of position numbers that correspond to at least one subsequent position number as regards the differences in the difference number partial sequence.

When all the matchings have been carried out, the x coordinate for which Numbermatch was greatest is selected. The coordinate is saved as a successful coordinate. In addition, the position numbers for the x coordinate can now easily be determined to be used at a possibly subsequent verifying step, as will be described below.

The algorithm above will now be illustrated by way of an example. Assume that a partial area has been imaged, which contains symbols which for the x coordinate give rise to the following partial sequence P of position numbers. These position numbers define a partial sequence D of difference numbers. Further assume that the partial area has not been imaged correctly and that the incorrect partial sequence P* has been obtained in the position calculation based on the information from the imaged partial area. Finally assume that the main number sequence is 63 bits long, which means that the differences between the position numbers which indicate the places in the main number sequence are calculated modulo 63.

| P =  | 23 | 12 | 54 | 43 | 7  | 18 | 11 | 35 |
|------|----|----|----|----|----|----|----|----|
| D =  | 52 | 42 | 52 | 27 | 11 | 56 | 24 |    |
| P* = | 23 | 55 | 54 | 43 | 7  | 42 | 11 | 35 |

The position numbers No. 1 (55, i.e. second position number from left in P*) and No. 5 (42, i.e. sixth position number from left in P*) have thus been decoded incorrectly. The algorithm described above will in this Example function as follows Numbermatch=0
P6:
(35-11)mod63=24. P6 matched. Numbermatch=1
P5:
(11-42)mod63=32 (should be 56) No match
(35-42)mod63=56 (should have been 17=(56+24)mod63. No match. P5 not matched.
P4:
(42-7)mod63=35 (should have been 11) No match.
(11-7)mod 63=4=(11+56)mod63. P4 matched. Numbermatch=2

P3:
(7−43)mod63=27. P3 matched. Numbermatch=3
P2:
(43−54)mod63=52. P2 matched. Numbermatch=4
P1:
(54−55)mod36=62 (should have been 42) No match.
(43−55)mod63=51 (should have been 31=(42+52)mod63. No match.
(7−55)mod63=15(should have been 58=(42+52+27)mod63. No match.
(42−55)mod63=50 (should have been 6=(42+52+27+11)mod63. No match.
(11−55)mod63=19 (should have been 62=(42+52+27+11+56)mod63. No match.
(35−55)mod63=43 (should have been 23)=(42+52+27+11+56+24)mod63. No match.
P1 not matched.
P0:
(55−23)mod63=32 (should have been 52). No match.
(54−23)mod63=31=(52+42)mod63. P0 matched. Numbermatch=5

The algorithm will thus arrive at the fact that five position numbers correspond with at least one subsequent position number as regards the differences in the difference number partial sequence. The number of corresponding position numbers is used as a measure of the matching probability.

The above example of how the x coordinate can be matched if the position calculation has failed for both coordinates of course functions just as well if one begins with the y coordinate instead of the x coordinate.

When the first coordinate has been determined by matching, the second coordinate can be determined in the same way as described above for the case where the position calculation has failed merely for one coordinate, or in the same way as for the first coordinate of the two failed ones.

The above algorithm can be optimized by several matchings being evaluated simultaneously and by the sums of the difference numbers being processed more efficiently. The algorithm can then be as follows, where $ss_i$ for each matching is equal to $sum(s_0 \ldots s_i)$

```
For each matching
    For k = 0 to 6
        For i= 0 to 6−k
            dp= p_{k+i+1}−p_k
            If dp = ss_i
                Numbermatch_k= Numbermatch_k+1
                Interrupt innermost loop;
            End
        End
    End
```

Check whether $Numbermatch_0$ is the greatest so far, in that case save value of $Numbermatch_0$ and the corresponding x coordinate.

```
For j=0 to 5
    Numbermatch_j = Numbermatch_{j+1}
End
Numbermatch_6 = 0
d= the next preceding difference number in the
difference number sequence.
For j=6 to 1
    ss_j=ss_{j−1} + d
End
ss_0 = d
End
```

Figure 20:
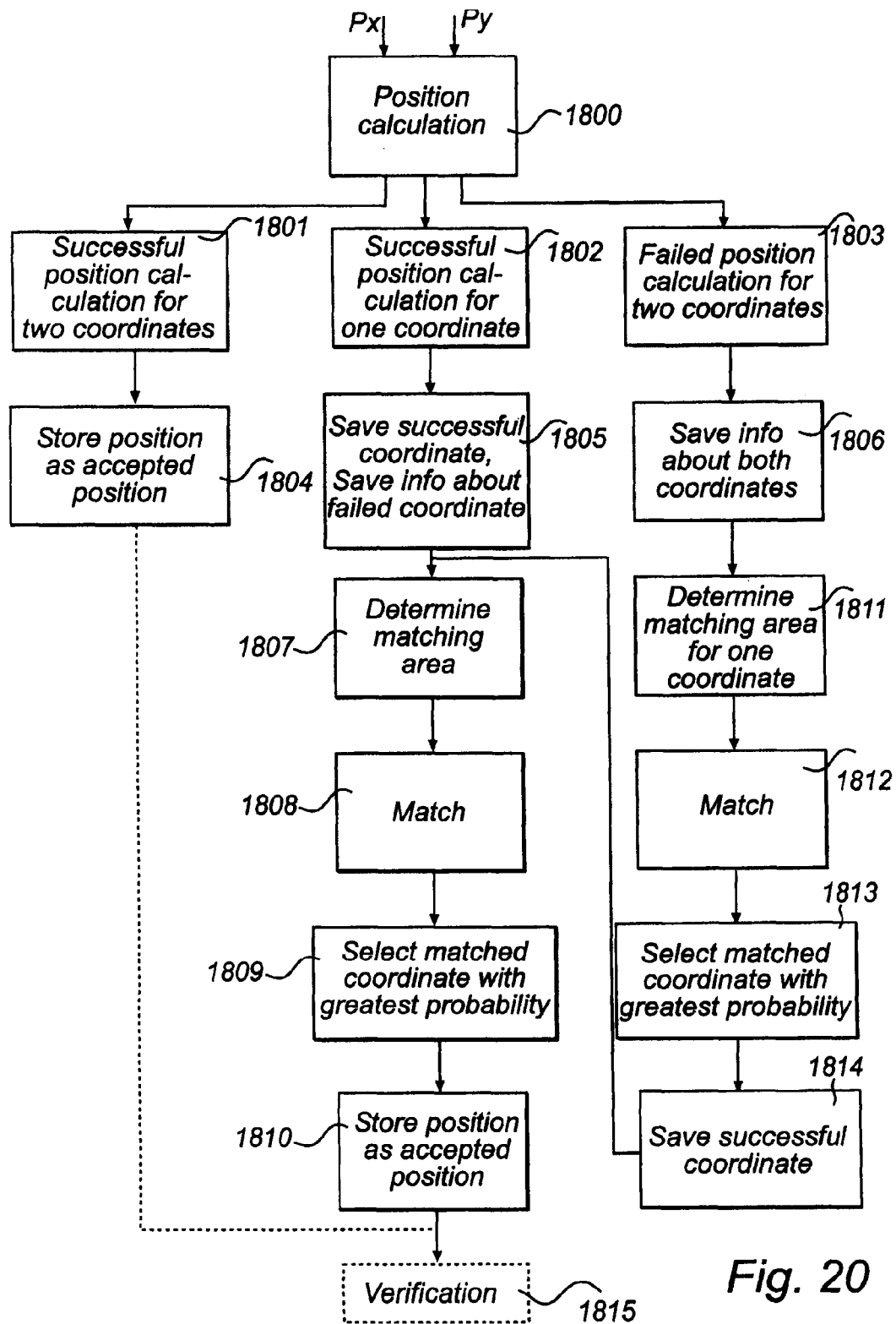
FIG. 20 is a flow chart showing position decoding.

The matching can advantageously be terminated with a verifying step, step 1815, which is indicated by dashed lines in FIG. 20. There is in fact an increased risk of errors since the matching algorithm will always find a position close to a previously accepted position. This means that it is not possible to look at the distance from the accepted position to assess whether the matched position is correct or not. The verifying step may comprise calculating the probability for the obtained position by means of all information available in the imaged partial area. As a rule, this comprises considerable more symbols than the 8*8 symbols used in the position calculation. For instance, it may comprise 16*16 symbols. For each of these symbols, a probability value (also referred to as a value probability in appendix B) has been determined for each of the values which the symbol can assume. When a pair of coordinates has been determined by means of the best 8*8 area, the values of these 8*8 symbols are known and, thus, the bits in the columns and the rows respectively in the corresponding 8*8 bit x and y bit matrices. Since the columns and rows constitute partial sequences of a binary cyclic main number sequence, it is then determined, knowing the difference number sequence, how the columns and rows continue in the larger 16*16 area. With the aid of the probability values for the bits in the 16*16 area, it is then possible to calculate a probability measure of the entire 16*16 area and compare this with a threshold value to determine whether the total probability for the 16*16 area is sufficiently great for the decoded position to be finally accepted.

Figure 21:
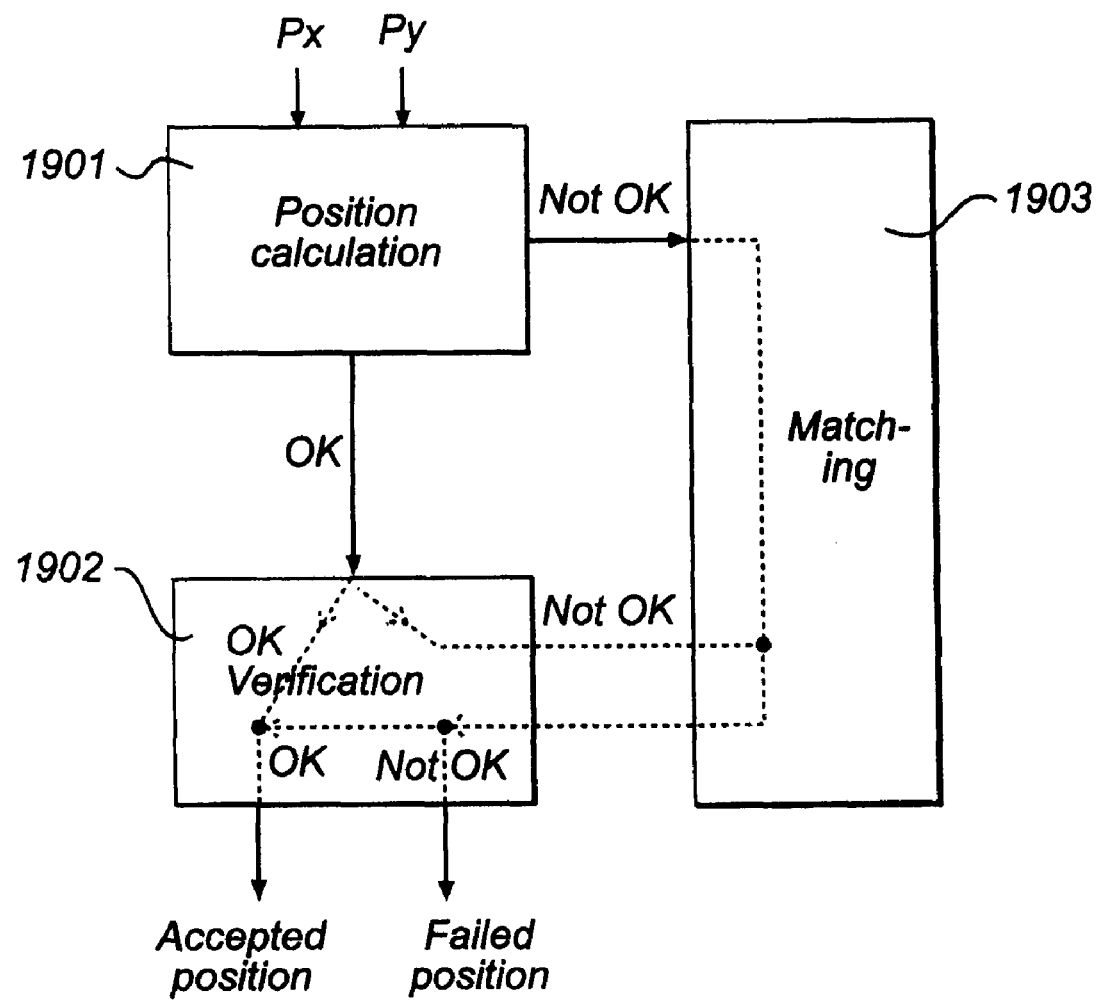
FIG. 21 is a schematic block diagram showing position decoding.

The entire method is summarized in the block diagram in FIG. 21. First, a position calculation 1901 is carried out. If this succeeds, the position proceeds to verification 1902. If this succeeds, the position is accepted. If the position calculation fails, a matching 1903 is carried out. This is carried out even if the verification fails for a position for which the position calculation succeeded. The matching always gives rise to a position. This proceeds to verification 1902. If the verification succeeds for the position obtained by matching, this is accepted, otherwise the position decoding has failed and no position is recorded for the imaged partial area. In the special case where the position calculation has succeeded, the immediately subsequent verification failed as has the verification after matching, but the calculated position and the matched position are equal, the position can still be accepted.

The position-coding pattern can be read and decoded using different types of devices for position decoding. Such a device can have a sensor for making a digital representation of the position-coding pattern and a signal-processing unit for identifying in the digital representation the position-coding pattern and decoding the same. The signal-processing unit can consist of a processor with memories and suitable programs or specific hardware or digital and/or analog circuits or a suitable combination thereof.

The sensor can be any kind of sensor that is suitable for imaging the position-coding pattern so that an image of the marks is obtained in black and white, in gray scale or in color. The sensor can be a solid-state single- or multi-chip device which is sensitive to electromagnetic radiation in any suitable wavelength range. For example, the sensor may include a CCD element (Charge Coupled Device), a CMOS element (Complementary Metal-Oxide Semiconductor), or a CID element (Charge Injection Device). Alternatively, the sensor may include a magnetic sensor array for detection of a magnetic property of the marks. Still further, the sensor may be designed to form an image of any chemical, acoustic, capacitive or inductive property of the marks.

Figure 22:
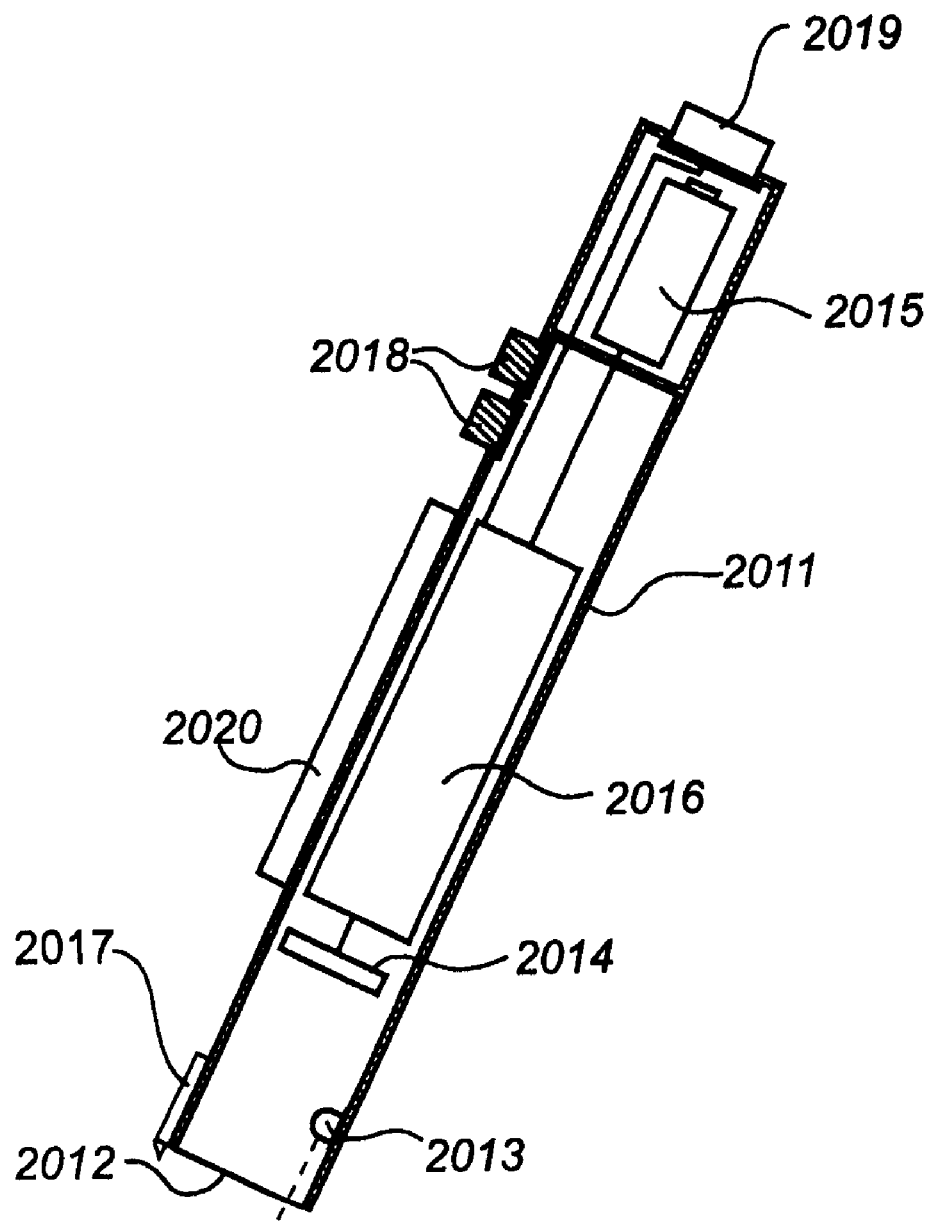
FIG. 22 shows schematically a device in which the position decoding can be carried out.

An example of a device for position decoding is shown in FIG. 22. The device can constitute the user unit in FIG. 1. It comprises a casing 2011 having approximately the same shape as a pen. In one short side of the casing there is an opening 2012. The short side is intended to abut against or be placed a short distance from the surface on which the position determination is to take place.

The casing essentially contains an optics part, an electronic circuitry part, and a power supply.

The optics part comprises a light-emitting diode 2013 for illuminating the surface which is to be imaged and a light-sensitive area sensor 2014, such as a CCD or CMOS sensor, for recording a two-dimensional image. The device may also comprise an optical system, such as a mirror and/or lens system. The light-emitting diode can be an infrared light-emitting diode and the sensor can be sensitive to infrared light.

The power supply to the device is obtained from a battery 2015 which is mounted in a separate compartment in the casing. The power supply can also be obtained via a cable from an external power source (not shown).

The electronic circuitry part comprises a processor unit 2016 with a processor which is programmed to read images from the sensor and carry out position calculation, matching and verification on the basis of these images, as well as a working memory and a program memory.

Furthermore the device comprises in this embodiment a pen point 2017, with the aid of which it is possible to write ordinary pigment-based writing on the surface upon which the position determination is to be carried out. The pen point 2017 can be extendable and retractable so that the user can control whether or not it is to be used. In certain applications, the device need not have a pen point at all.

Suitably, the pigment-based writing is of a type that is transparent to infrared light and the marks absorb infrared light. By using a light-emitting diode which emits infrared light and a sensor which is sensitive to infrared light, the detection of the pattern takes place without the above-mentioned writing interfering with the pattern.

Moreover, the device may comprise buttons 2018 by means of which the user activates and controls the device. It also comprises a transceiver 2019 for wireless transfer, e.g. using IR light, radiowaves or ultrasound, of information to and from the device. The device can also comprise a display 2020 for showing positions or recorded information.

The device can be divided into different physical casings, the sensor and other components that are necessary for capturing images of the position-coding pattern and for transferring them to a second casing being located in a first casing, while the signal-processing unit and the other components that are necessary for carrying out the position decoding are located in the second casing.

APPENDIX A

The position code is used to code positions in one or more dimensions. In order to simplify the description, the position coding is first considered in a first dimension, which in this example is in the x-direction. A cyclic main number sequence is used for the coding in this direction, which cyclic main number sequence has the property that the place in the cyclic main number sequence of each partial sequence of a predetermined length is unambiguously determined. In this example, the predetermined length is 6. Thus if six consecutive numbers are taken from any place in the cyclic main number sequence, then these six numbers will only occur once in the main number sequence in this order. The property also applies if the end of the main number sequence is connected to the beginning of the main number sequence. The main number sequence is therefore called cyclic. In this example, a binary main number sequence is used. If the place of a partial sequence with six numbers is to be unambiguously determined, the main number sequence can thus have a maximal length of $2^6=64$ and the partial sequences of length 6 can have the places 0-63 in the main number sequence. If, however, a main number sequence of length 63 is selected, improved error-correction properties are obtained, as will be described below. In the following, it is thus assumed that the length of the main number sequence is 63 and that it thus defines unique places in the range 0-62. With this length of the main number sequence it is in practice feasible to have a table that converts each partial sequence into a place in the main number sequence and vice versa.

Assume that the commencement of the main number sequence is as follows:

0,0,0,0,0,0,1,0,0,1,1,1,1,1,0,1,0 . . .

The partial sequence 0,0,0,0,0,0 has then, for example, the unambiguous place 0, the partial sequence 1,1,1,1,1,0 has the unambiguous place 9 and the partial sequence 1,1,1,0,1,0 has the unambiguous place 11 in the main number sequence.

The position coding is based on utilizing different rotations or circular shifts of the cyclic main number sequence. In order to code positions in the x-direction, the main number sequence is printed out or arranged in some other way, rotated or circularly shifted in various ways, in columns across the surface, that is in the y-direction orthogonal to the direction in which positions are to be coded. The main number sequence can be printed out repeatedly in the same column, which is required if more positions are to be coded in the y-direction than what corresponds to the length of the main number sequence. The same rotation of the main number sequence is then used for all the repetitions. However, different rotations can be used in different columns.

Figures 4, 5:
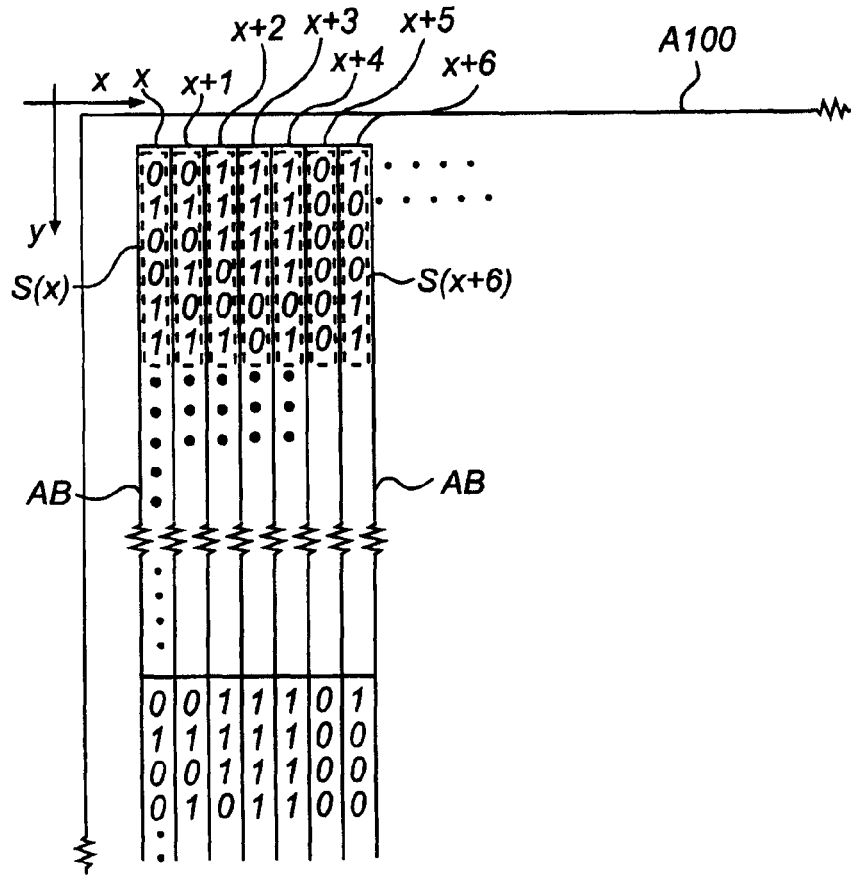
FIG. 4 shows schematically how the coding in the x direction can be carried out.
FIG. 5 shows schematically how a primary number sequence PD can be built up of four secondary number sequences A1-A4.
Figure 6:
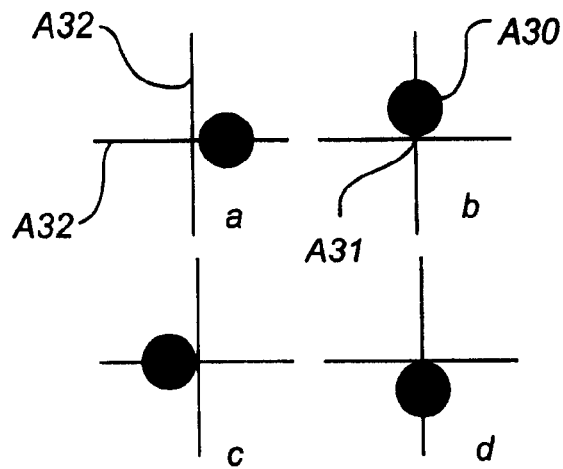
FIG. 6 shows an example of graphical coding of a position-coding pattern.

FIG. 4 shows schematically a sheet of paper A100 with seven columns x–x+6. Only the first numbers in the different rotations of the main number sequences are printed out. A whole main number sequence is marked schematically by a box AB. In addition, in FIG. 4 the first partial sequence S of six numbers is marked in each column by a box drawn with broken lines. As mentioned above, each of the partial sequences S has an unambiguously determined place in the main number sequence.

Each pair of adjacent columns defines a difference number d. The difference number d is given by the difference between the places in the main number sequence of the first partial sequence in the respective columns. If instead the difference is taken between the places of the partial sequences one step down in the columns, the result will be the same since the places are displaced in the same way. The difference number d will thus be the same, irrespective of at what "height" in the columns the places of the partial sequences in the main number sequence are compared. For each pair of columns the difference number d is thus constant in the y-direction.

The first partial sequence of the main number sequence in the column x+5 is 0,0,0,0,0,0, which corresponds to place 0 in the main number sequence. The first partial sequence of the main number sequence in column x+6 is 1,0,0,0,1,1, which corresponds to place 57 in the main number sequence. The difference or the circular shift between these columns is thus 57, so d(x+5)=57. It should be pointed out that the difference numbers are determined modulo the length of the main number sequence.

The difference numbers that can be coded in this way are in the range 0-K−1, where K is the length of the main number sequence which in this case is K=63 and with which it is thus possible to code difference numbers in the range 0-62. By selecting different rotations of the main number sequence, it is possible to create a sequence of difference numbers, in the following called a primary number sequence or primary difference number sequence, which has the property that each partial sequence of a predetermined length has an unambiguously determined place in the primary number sequence. In this example, the predetermined length is 5. As each partial sequence consisting of five difference numbers has an unambiguously determined place in the primary difference number sequence, this can be used to code positions in the x-direction. In FIG. 4, the partial sequences $S(x)-S(x+5)$ will thus code five difference numbers $d(x)-d(x+4)$ which give a partial sequence of the primary number sequence.

It should also be pointed out that in practice the partial sequences are not normally printed out with their explicit values but with a graphical coding.

The columns of the main number sequence's binary numbers form a matrix, which in the following will be called the x-matrix.

If the length of the main number sequence is K, the base in the primary difference number sequence will equal K and its maximal length will be $K^5$, that is in this case $63^5$. It is, however, not in practice feasible to use a table to convert partial sequences into places in the primary difference number sequence and vice versa for a base that is so large. If, however, the base is reduced in order to be able to use manageable tables, the number of positions that can be coded will be reduced.

This problem is solved by building up the primary difference number sequence of shorter difference number sequences, which in the following are called secondary difference number sequences or secondary number sequences, and by using the secondary difference number sequences, for which the partial sequences and their places can be arranged in smaller tables, when coding and decoding the position code, in order to determine the partial sequence in the primary difference number sequence that corresponds to a particular x-coordinate and vice versa.

The secondary difference number sequences can be determined as follows:

Firstly, difference numbers are allowed only in a range that is such that the number of different difference numbers can be factored into at least two factors. In the example with a main number sequence of length 63, difference numbers are allowed only within a range of length 54. The number 54 can, in fact, be factored as 2*3*3*3. Alternatively, 60 difference numbers, that is 5*3*2*2 difference numbers, could be selected, but in order for the tables to be as small as possible it may be expedient to select numbers that give as small factors as possible.

Secondly, the same number of secondary difference number sequences are formed as the number of factors that the number of different difference numbers can be factored into. In this example, the number of secondary difference number sequences is thus equal to four.

In addition, we let each factor form a base in its respective secondary difference number sequence. In this example, we thus obtain one secondary difference number sequence with the base two and three secondary difference number sequences with the base three.

The maximal length of the secondary difference number sequences is thus 32 and 243 respectively if the secondary difference number sequences are also to have the property that a partial sequence of length five is to have a unique place in the secondary difference number sequence. With such lengths of the secondary difference number sequences, it is in practice feasible to convert partial sequences into places and vice versa. If instead we had chosen to use 60 difference numbers, we would have had a secondary difference number sequence with the base 5 and thus a maximal length of 3125, which gives a table that takes considerably more memory, but is, however, still manageable.

Finally, the length of the secondary difference number sequences is selected so that the lengths are relatively prime in pairs. This means that for each pair of secondary difference number sequences the length of one difference number sequence is not to have any factor in common with the length of the second difference number sequence. This means in addition that if each of the difference number sequences is repeated, then the same combination of a partial sequence from each secondary difference number sequence will not arise until after $L=l_1*l_2*\ldots*l_m$ places, where $l_1$ is the length of the secondary difference number sequence 1, $l_2$ is the length of the secondary difference number sequence 2, and so on up to $l_m$ which is the length of the last secondary difference number sequence. If there are only two secondary number sequences, of course, $L=l_1*l_2$.

This is illustrated schematically in FIG. 5. At the top is shown the primary number sequence PD which runs in one long sequence with difference numbers that are here only indicated by X. Underneath are shown schematically the secondary number sequences A1-A4. Vertical lines show where the number sequences recommence. A partial sequence of the primary number sequence and corresponding partial sequences of the secondary number sequences are indicated by broken lines. It can be seen that the partial sequences correspond to different places in the secondary number sequences.

The representation of partial sequences of the primary difference number sequence by combinations of partial sequences of the secondary difference number sequences is, in this example, bijective. This is not, however, necessary.

The position coding in a second dimension, for example in the y-direction in this case, can be carried out in accordance with the same principle as the position coding in the first dimension. The main number sequence is then arranged with different circular shifts in rows on the surface, that is in the x-direction in FIG. 4. Difference numbers are defined between adjacent rows and these difference numbers form a primary difference number sequence, that can be built up of secondary difference number sequences. It is possible to use another main number sequence, another primary difference number sequence and other secondary difference number sequences in the second dimension. The bases in the various number sequences can also be other than those that are used for the coding in the first dimension. In this example, however, the same sequences are used in both the x-direction and the y-direction. In a corresponding way to the coding in the x-direction, the coding in the y-direction results in a matrix in which the values of the rows consist of the binary values of the main number sequence.

If the x- and y-matrices are superimposed, for each point in the resulting xy-matrix there will be one bit from the x-matrix and one bit from the y-matrix. At each point the following four bit combinations can thus be obtained: 0,0; 0,1; 1,0; and 1,1. These different combinations can be coded graphically on a surface, for example in the way shown in FIGS. 6*a-d* in which a dot A30 is displaced in any one of four directions from a nominal point A31 in a raster, in which each nominal point corresponds to the intersection between lines A32 in the raster. This type of graphical coding is described in greater detail in WO 01/26033, in which the actual underlying position coding is, however, carried out in a different way. The coding that is used in this example is as follows:

| Value | Displacement | Pair of bits |
|-------|--------------|--------------|
| 1 | right | 0, 1 |
| 2 | upwards | 0, 0 |
| 3 | left | 1, 0 |
| 4 | downwards | 1, 1 |

The raster can be virtual, in which case it is thus not printed out explicitly on the surface with the position code.

Figure 7:
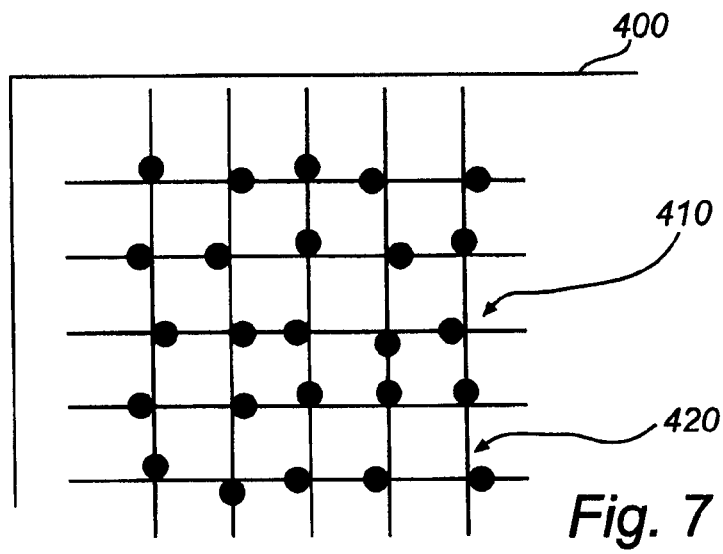
FIG. 7 shows a product with an enlarged position-coding pattern.

FIG. 7 shows schematically a part of a product in the form of a sheet of paper 400 with position code 410. It should be emphasized that the position code in FIG. 7 is greatly enlarged in relation to a version that is suitable for digitizing handwriting, for example. In addition, the raster 420 is marked in FIG. 7. Normally, however, this is not printed out.

Of course, other types of graphical coding can be selected for the four pairs of bits, such as four dots of different sizes, four marks with different shapes or four marks with different rotation.

As the position coding is based on differences between places of different partial sequences in the main number sequence and the same differences can be obtained using different pairs of partial sequences, the primary difference number sequence can be achieved in various ways. More specifically, 63 different "versions" of the primary difference number sequence can be achieved, depending upon which partial sequence, that is which rotation of the main number sequence, is selected to start the very first column (x=0) in the x-matrix and the very first row (y=0) in the y-matrix. It is thus possible to generate K*K (in this example 63*63=3969) different "versions" of the position code that utilize the same primary difference number sequence for the coding in the x-direction and the y-direction. These different versions of the position code are called sections in the following. The section number xs for the position code in the x-direction and the section number ys for the position code in the y-direction can be designated as an additional coordinate for the x-direction and y-direction respectively.

In the example above, only a subset is used of the difference numbers that theoretically can be coded using the main number sequence, more specifically only 54 of 63 possible difference numbers. The partial range of the theoretically possible difference numbers can be selected in various ways. In this example, difference numbers close to zero (modulo the length of the main number sequence) can create unwanted regularities in the position code. Therefore in this example difference numbers are selected in the range (5,58). This must be taken into account in connection with the conversion between the partial sequence in the primary number sequence and the partial sequences in the secondary number sequences, which will be described in the following.

Now assume that the position code is arranged on a surface. A reading device can have an area sensor that detects a subset of the position code corresponding to at least 6*6 dots. When reading off, the reading device can be held rotated in various ways in relation to the position code. An image of the position code does not in itself reveal the rotation between the position code and the reading device, as the position code in principle looks the same whether it is rotated through 0, 90, 180 or 270 degrees. When the position code is rotated, the direction of the displacement of each dot is, however, changed, which in turn leads to the pair of bits that is coded by the displacement of the dot being changed. How the change occurs depends on the conversion between displacement and pair of bits. Below it is assumed that the conversion is carried out as described above. There are three different cases:

1) With 180 degrees rotation of the image of the position code, the cyclic main sequence that codes x- and y-positions in the non-rotated position code will be read backwards when an attempt is made to decode the position on the basis of the image. With the combination of displacements and pairs of bits described above, the bits that are decoded will be inverted since the position code is read upside down.

2) With 90 degrees rotation in a clockwise direction, a bit sequence that codes the x-position in the non-rotated matrix will be read backwards when an attempt is made to decode the y-position in the rotated matrix and the bits will be inverted.

3) With 270 degrees rotation in a clockwise direction, a bit sequence that codes the y-position in the non-rotated matrix will be read backwards when an attempt is made to decode the x-position in the rotated matrix and the bits will be inverted.

This means that if the partial sequences in the right-way-up, non-rotated matrix never occur inverted and backwards in the cyclic main number sequence, then 90, 180 and 270 degrees rotation can be detected. If such a condition is to be fulfilled for the main number sequence this means that its length is reduced considerably, which in turn means that fewer positions can be coded.

Figure 8:
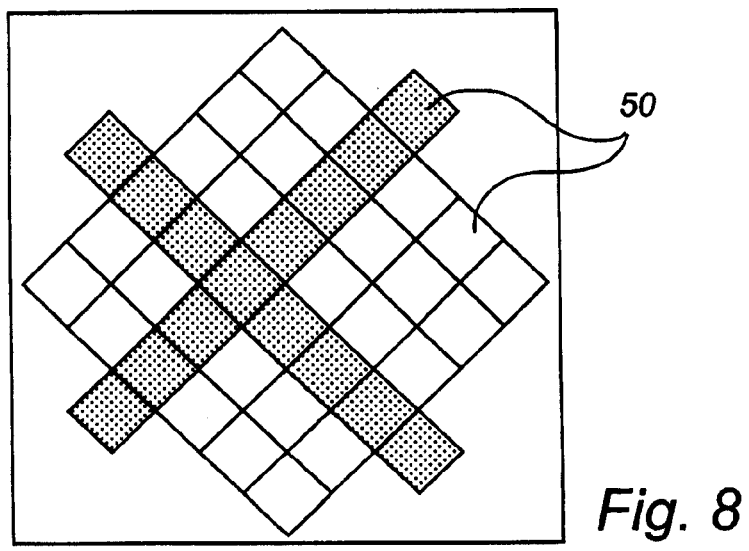
FIG. 8 shows how extra symbols can be read to be used for error correction purposes.

In order to solve this problem, we instead let the condition be fulfilled for longer partial sequences of the cyclic main number sequence. This means that longer partial sequences than what is required for the actual position determination must be read off. In certain cases, such longer partial sequences are already available during the reading off. If the least subset of the position code that codes the coordinates for a position is quadratic, as is the case in this example, a part of the position code must always be read off that is so large that it also includes the whole of the least subset even when the reading device is rotated through 45 degrees in relation to the position code. Therefore, at least one partial sequence that is longer than what is required for the position determination is always included. This is illustrated in FIG. 8, where each square 50 corresponds to a dot and the gray-shaded squares illustrate that it is always possible to read off at least one row and one column with two extra dots.

In the current example where the partial sequences of the main number sequence for position determination have the length 6, partial sequences of length 8 can be used for the detection of the rotation. These eight bit long partial sequences must thus have the property that they do not occur backwards and inverted in the main number sequence. This property cannot be achieved for a 64 bit long main number sequence, which is the reason that the length is selected as 63 instead.

In two of the above-mentioned rotations, viz. 90 and 270 degrees, one sequence turned the right way round and one sequence turned the wrong way round will be read off. With the above-described method for rotation detection, a rotation error will be detected in only a first of the two reading-off directions (x and y). In the second reading-off direction the circular shifts that code the position in the first reading-off direction of the correctly rotated image will be seen.

In the case of the 90 degree rotation in a clockwise direction, the circular shifts that code the y-coordinate of the correctly rotated image will be seen when decoding in the x-direction. It is thus the partial sequence of the primary difference number sequence of the y-direction which is seen, but turned the wrong way round (running from the right to the left instead of from the left to the right, which would be the case of the partial sequence of the primary difference number sequence of the x-direction).

In the corresponding way, the partial sequence of the primary difference number sequence of the x-direction will be seen turned the wrong way round, when decoding in the y-direction in the case of the 270 degree rotation.

The reason why the partial sequences appear turned the wrong way round, is the relative orientation of the primary difference number sequences of the x- and y-directions. Starting from the edge of the total position coding pattern, the primary difference number sequence of the x-direction is running in the clockwise direction, while the primary difference number sequence of the y-direction is running in the counterclockwise direction. If they had been running in the same direction, they would not have been turned the wrong way round, but the right way round in the above-described cases.

There are a number of advantages of letting the primary difference number sequences run in opposite directions. In those cases where the partial sequence of the primary difference number sequence is seen turned the right way round, the "correct" coordinate will be decoded, but in the wrong direction. This coordinate will not only correspond with the six circular shifts from the primary difference number sequence required for the decoding, but surrounding shifts will confirm that the decoded coordinate is correct. In the case where the primary difference number sequences are running in opposite directions, six circular shifts from a primary difference number sequence are also decoded, but in the wrong order, resulting in a coordinate which statistically will not correspond with surrounding parts of the wrongly turned primary difference number sequence. This fact results in better possibilities for error detection.

Another advantage is that the risk of successive errors, i.e. errors where a plurality of successive images are decoded to adjacent positions, is less if the primary difference number sequences are running in opposite directions. More particularly, different adjacent sets of six circular shifts in a primary difference number sequence turned in the wrong way tend not to code adjacent coordinates. Successive errors are more difficult to detect than other errors where the spread of the incorrect coordinates is large. The same basic principles as are used for the detection of rotation can be used for error correction. The main number sequence can, for example, be selected in such a way that partial sequences of some predetermined length that is longer than what is required for position determination do not occur with a bit inverted in the main number sequence. If all the bits except one in such a longer partial sequence can be detected with certainty, then the incorrect bit can be corrected.

Such error-detection and error-correction properties of the position code can be improved considerably by an intelligent choice of the main number sequence. Further improvement can be achieved by the selection of the secondary difference number sequences.

In the example above, the main number sequence and the secondary difference number sequences have been selected in the following way.

The Main Number Sequence M:
0,0,0,0,0,0,1,0,0,1,1,1,1,1,0,1,0,0,1,0,0,0,0,1,1,1,0,1,1,1, 0,0,1,0,1,0,1,0,0,0,1,0,1,1,0,1,1,0,0,1,1,0,1,0,1,1,1,1,0,0,0, 1,1

Secondary Difference Number Sequences: A1=0,0,0,0,0,1,0, 0,0,0,2,0,1,0,0,1,0,1,0,0,2,0,0,0,1,1,0,0,0,1,2,0,0,1,0,2,0,0, 2,0,2,0,1,1,0,1,0,1,1,0,2,0,1,2,0,1,0,1,2,0,2,1,0,0,1,1,1,0,1, 1,1,1,0,2,1,0,1,0,2,1,1,0,0,1,2,1,0,1,1,2,0,0,0,2,1,0,2,0,2, 1,1,1,0,0,2,1,2,0,1,1,1,2,0,2,0,0,1,1,2,1,0,0,0,2,2,0,1,0,2,2, 0,0,1,2,2,0,2,0,2,2,1,0,1,2,1,2,1,0,2,1,2,1,1,0,2,2,1,2,1,2,0, 2,2,0,2,2,2,0,1,1,2,2,1,1,0,1,2,2,2,2,1,2,0,0,2,2,1,1,2,1,2,2, 1,0,2,2,2,2,2,0,2,1,2,2,2,1,1,1,2,1,1,2,0,1,2,2,1,2,2,0,1,2,1, 1,1,1,2 ,2,2,0,0,2,1,1,2,2

A2=0,0,0,0,0,1,0,0,0,0,2,0,1,0,0,1,0,1,0,1,1,0,0,0,1,1,1, 1,0,0,1,1,0,1,0,0,2,0,0,0,1,2,0,1,0,1,2,1,0,0,0,2,1,1,1,0,1,1, 1,0,2,1,0,0,1,2,1,2,1,0,1,0,2,0,1,1,0,2,0,0,0,1,0,2,1,2,0,0,0,2, 2,0,0,1,1,2,0,2,0,0,2,0,2,0,1,2,0,0,2,2,1,1,0,0,2,1,0,1,1,2,1, 0,2,0,2,2,1,0,0,2,2,2,1,0,1,2,2,0,0,2,1,2,2,1,1,1,1,1,2,0,0,1, 2,2,1,2,0,1,1,1,2,1,1,2,0,1,2,1,1,1,2,2,0,2,2,0,1,1,2,2,2,2,1, 2,1,2,2,0,1,2,2,2,0,2,0,2,1,1,2,2,1,0,2,2,0,2,1,0,2,1,1,0,2,2, 2,2,0,1,0,2,2,1,2,2,2,1,1,2,1,2,0,2,2,2,

A3=0,0,0,0,0,1,0,0,1,1,0,0,0,1,1,1,1,0,0,1,0,1,0,1,1,0,1, 1,1 ,0,1,

A4=0,0,0,0,0,1,0,2,0,0,0,0,2,0,0,2,0,1,0,0,0,1,1,2,0,0,0, 1,2,0,0,2,1,0,0,0,2,1,1,2,0,1,0,1,0,0,1,2,1,0,0,1,0,0,2,2,0,0, 0,2,2,1,0,2,0,1,1,0,0,1,1,1,0,1,0,1,1,0,1,2,0,1,1,1,1,0,0,2,0, 2,0,1,2,0,2,2,0,1,0,2,1,0,1,2,1,1,0,1,1,1,2,2,0,0,1,0,1,2,2,2, 0,0,2,2,2,0,0,1,2,1,1,2,0,2,0,0,0,1,2,2,0,1,1,2,1,0,2,1,1,0,2,0,2,1, 2,0,0,1,1,0,2,1,2,1,0,1,0,2,2,0,2,1,0,2,2,1,1,1,1,2,0,2,1,1,1,0, 2,2,2,2,0,2,0,2,2,1,2,1,1,1,1,2,1,2,1,2,2,2,1,0,0,2,1,2,2,1,0, 1,1,2,2,1,1,2,1,2,2,2,2,1,2,0,1,2,2,1,2,2,0,2,2,2,1,1.

The secondary difference number sequences have the following special error-correction properties:

Assume that precisely one of the partial sequences of the main number sequence is decoded incorrectly, which leads to an incorrect place in the main number sequence being decoded. As each place is used to calculate two adjacent difference numbers, these will both be affected by the incorrect decoding. If any one of the difference numbers is outside the difference number range used (5,58), the error will be detected immediately. If this is not the case, however, at least one partial sequence in the combination of partial sequences of the four secondary difference number sequences in which the partial sequence of the primary difference number sequence results will be distorted in two adjacent positions. As the two first secondary difference number sequences A1 and A2 both have the base 3 and the number of unused difference numbers is 9=3*3, a distortion in any one of these two sequences has the property that the sum of the two affected numbers always has the same value modulo 3. The two secondary number sequences A1 and A2 have the property that for each partial sequence of length 7 at most one of 14 possible distortions of the partial sequence that are caused by a single incorrect place decoding will be found in the secondary number sequence. The third secondary number sequence A3 has in addition the property that for each partial sequence of length 7 at most one of 13 possible distortions of the partial sequence that are caused by a single incorrect place decoding will be found in the secondary number sequence. The fourth secondary number sequence A4 has the same property for at most seven of 28 possible distortions. The probability of a single incorrect decoding of a partial sequence of the main number sequence being detected is thus great.

With the selected sequences, a total of 410815348 different positions can be coded in each dimension of a section. The number of different sections that can be coded is as mentioned $63^2$. The total number of positions that can be coded is thus $63^2 * 410815348^2 = 6.7*10^{20}$ positions.

If each position corresponds to a surface of $0.3*0.3$ mm$^2$, this corresponds to unique positions being able to be coded on a surface of 60 million km$^2$. This surface that is made up by all the unique points that theoretically can be coded by means of the position code can be called an imaginary surface. The coordinates that the position code codes are thus absolute coordinates for points on the imaginary surface. Parts of the position code can be applied on a physical base or surface. The position code then codes positions on this base. However, the coordinates do not normally relate to absolute coordinates for the positions on the physical base but for the points on the imaginary surface.

Practical Example of Position Decoding

The position code can be decoded in a decoding device that can comprise a sensor for reading off the position code and a processor unit of some suitable type. The processor unit comprises the actual processor, working memory and program memory, in which is stored a computer program with instructions for decoding the position code. The processor unit can be incorporated in a typical personal computer, in a hand-held reading device or in some other suitable device. The decoding device can alternatively be realized by special-purpose hardware, such as an ASIC or an FPGA or a similar unit that can be adapted so that it is suitable for this specific task, or by digital and/or analogue circuits or by some suitable combination thereof.

A specific example of a decoding device will be described below.

Figure 9:
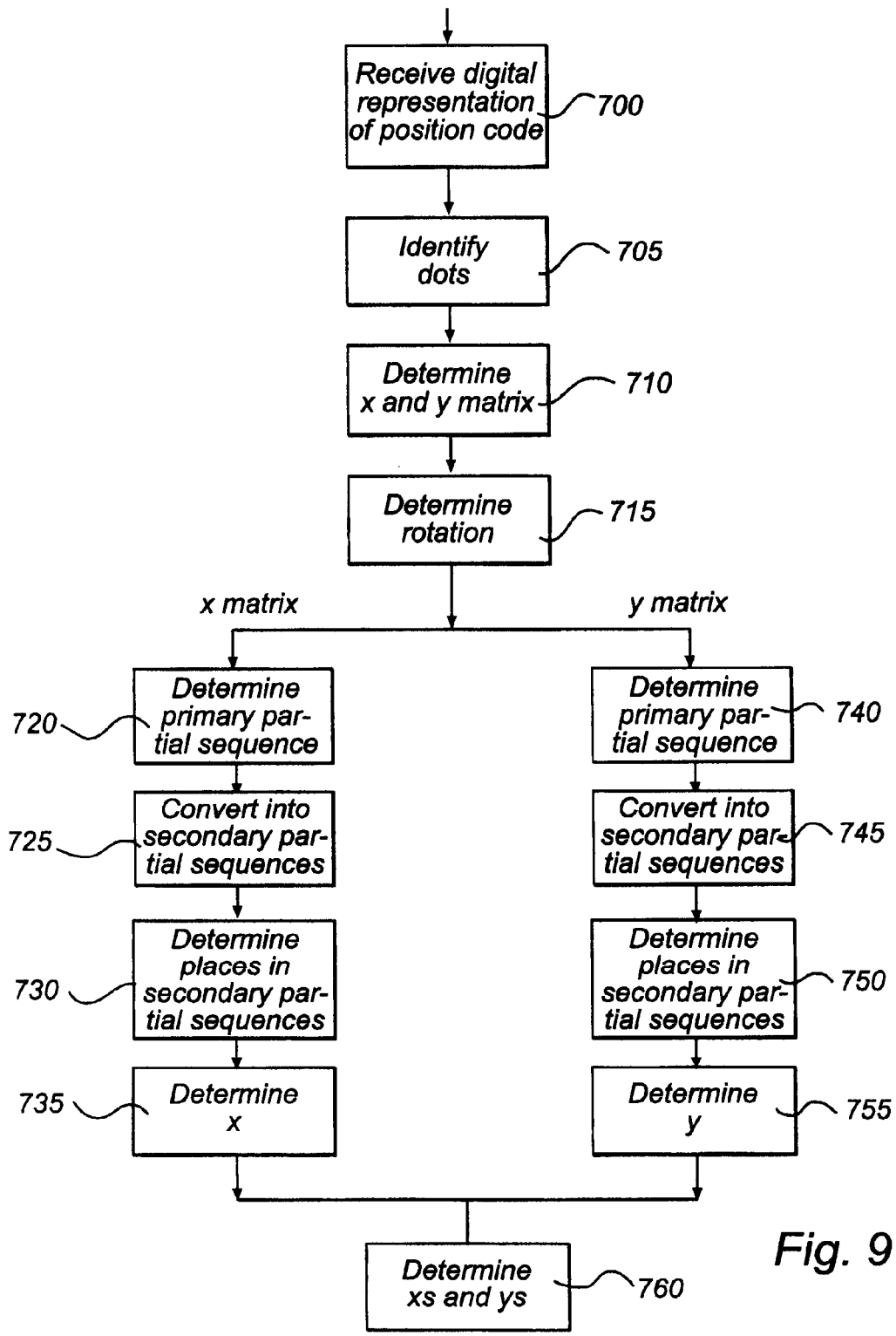
FIG. 9 is a flow chart which shows an example of how a position-coding pattern can be decoded.

The following description refers to the flow chart in FIG. 9.

The input signal to the decoding device consists of an image or some other digital representation of a detected subset of the position code, which subset codes coordinates for at least one point, step 700. In this example, the position code is represented graphically by dots that are displaced in a predetermined way in relation to raster points in a raster, as has been described above.

In a first step of the decoding, the decoding device identifies the dots in the image, for example by the use of thresholding, and fits a raster to the dots, step 705. The raster can, for example, be determined in the way that is described in Applicant's Patent Application WO 01/26033, by utilization of the distance between different pairs of dots or else in the way described in WO 01/75783 by the utilization of Fourier transforms. For each raster point, the displacement of the associated dot is determined and given a value 0-3 depending upon the displacement. A matrix of at least the size $(n_1+1)*(n_1+1)$ is selected, where $n_1$ is the length of the partial sequences of the main number sequence which are used for positioning and the places of which are unambiguously determined in the main number sequence. In the example concerned, an 8*8 matrix is selected $((n_1+2)*(n_1+2))$. This matrix is separated into an x-matrix (also called x-position code) and a y-matrix (also called y-position code) by the displacement values being converted into pairs of bits by being looked up in a table OI that converts displacement values into pairs of bits, step 710. The first bit in each pair of bits forms the x-matrix and the second bit in each pair of bits forms the y-matrix.

In the next step, the four possible types of rotation of the x- and y-matrices (0, 90, 180 and 270 degrees) are investigated and the current rotation is determined, step 715. Use is made of the previously described fact that, in the event of incorrect rotation of the matrix, partial sequences of length 8 occur which are missing in the main number sequence.

At the same time, a certain degree of error correction can be carried out on the basis of the partial sequences of length 8.

When the correct rotation has been determined, in the following steps only the x- and y-matrices are used that are in the middle and turned the right way round and that are $n_1*n_1$ in size, that is in this example two 6*6 matrices. The x-matrix and y-matrix are decoded in parallel or sequentially with x before y or vice versa, which is indicated by the parallel flows in FIG. 9.

In a first step 720 of the decoding of the x-matrix, a partial sequence of the primary difference number sequence is determined, which is called the primary partial sequence in FIG. 9. More specifically, in the x-matrix, the bits in the columns in the matrix constitute partial sequences of the main number sequence. Corresponding places in the main number sequence are determined by being looked up in a table MI that converts partial sequences into places. Thereafter, the difference numbers are determined which are coded by the partial sequences of the main number sequence. In this example, they are five in number. More specifically, the difference numbers are determined as the difference d between the places of adjacent partial sequences, the difference being determined modulo the length of the main number sequence.

The sequence of difference numbers thus obtained is thus a partial sequence of the primary difference number sequence, which is used for the coding in the x-direction, but which on account of its size is not stored in the decoding device. Instead, use is made of the property of the primary difference number sequence, that each partial sequence can be converted into a combination of a partial sequence from each of the secondary difference number sequences. In step 725, the primary partial sequence is thus converted into secondary partial sequences. More specifically, each difference number is rewritten as follows:

$$d = d1 + b_1*d2 + \ldots + b_1*b_2*b_{n-1}*dn,$$

where n is the number of secondary difference number sequences and $b_i$ is the base in the secondary difference number sequence i. In the example concerned, this becomes:

$$d = 5 + d1 + 3*d2 + 9*d3 + 18*d4$$

where d1-d4 can be determined by integer division or by table look-up.

Each of the five numbers in the decoded partial sequence of the primary difference number sequence thus results in four numbers d1, d2, d3, d4. Thus five d1 numbers are obtained that form a partial sequence of the first secondary difference number sequence, five d2 numbers that form a partial sequence of the second secondary difference number sequence, five d3 numbers that form a partial sequence of the third secondary difference number sequence and five d4 numbers that form a partial sequence of the fourth secondary difference number sequence. An example is given below:

| d  | 23 | 45 | 51 | 9 | 37 |
|----|----|----|----|---|----|
| d1 | 2  | 0  | 0  | 0 | 1  |
| d2 | 1  | 0  | 2  | 0 | 0  |
| d3 | 0  | 1  | 1  | 1 | 0  |
| d4 | 1  | 2  | 2  | 0 | 2  |

The respective places of the partial sequences in the secondary difference number sequences are determined, step 730, by being looked up in four tables $DCI_i$, that convert partial number sequences in the respective secondary difference number sequences into places in the respective secondary difference number sequences.

For each partial sequence, a place pi is thus obtained. For these places, it is the case that P=p1 (mod l1)
P=p2 (mod l2)
.
.
.
P=pm (mod lm)

where P is the place in the primary difference number sequence that corresponds to the coordinate x, pi is the place in the secondary difference number sequence i, li is the length of the secondary difference number sequence i and m is the number of secondary difference number sequences.

This system of equations can be solved using the well-known Chinese remainder theorem, as for example described in greater detail in Niven, Suckerman, Introduction to the theory of numbers, Springer Verlag. In step 735, x is thus determined.

Define L=prod (i=1,m)li and qi*(L/li)=1(mod li). The place P in the primary difference number sequence can then be obtained as:

$$P=(\text{sum}(i=1,n)((L/li)*pi*qi))(\bmod L)$$

In the example concerned $$L=l1*l2*l3*l4=236*233*31*241=410815348$$

and
q1=135
q2=145
q3=17
q4=62
are obtained.

If, for example, the places p1=97; p2=176; p3=3 and p4=211 are obtained for the partial sequences of the secondary difference number sequences, then the corresponding place P in the primary difference number sequence will be 170326961 according to the Chinese remainder theorem.

When P has been determined, the next step is to determine to which x-section the place belongs. This is carried out first under the assumption that y=0 and by the calculation of s(x,0), that is the place in the main number sequence of the partial number sequence for column x for xs=0. s(x,0) is calculated using the secondary difference number sequences in the same way as has been described above in connection with the determination of the position code for the position x. If s(x,0) is subtracted from the place of the first partial number sequence of the six partial number sequences that are used for the positioning in the x-direction, xs is obtained for y=0.

The y-matrix is decoded prior to, in parallel with or after the decoding of the x-matrix, a place in the primary difference number sequence being determined for the y-direction, in accordance with steps 740-755 in FIG. 9, in a corresponding way to that described above for the x-direction. In addition, the y-section ys concerned is calculated in a corresponding way to that described above for the x-section, but with the assumption that x=0. Finally, in step 760, xs can be determined taking y into account, and ys can be determined taking x into account by subtracting y (modulo the length of the main number sequence) from xs for y=0 and subtracting x (modulo the length of the main number sequence) from ys for x=0.

The following tables can thus be used for the decoding of the position code:

MI: that converts partial sequences of the main number sequence into places in the main number sequence, $DCI_i$: that converts partial sequences of each of the n secondary difference number sequences into places in the n secondary difference number sequences, and OI: that converts displacement values into pairs of bits.

It should be emphasized that the flow chart in FIG. 9 is a rough schematic example of how the position decoding can be realized, for example in a computer program.

APPENDIX B

Figure 10:
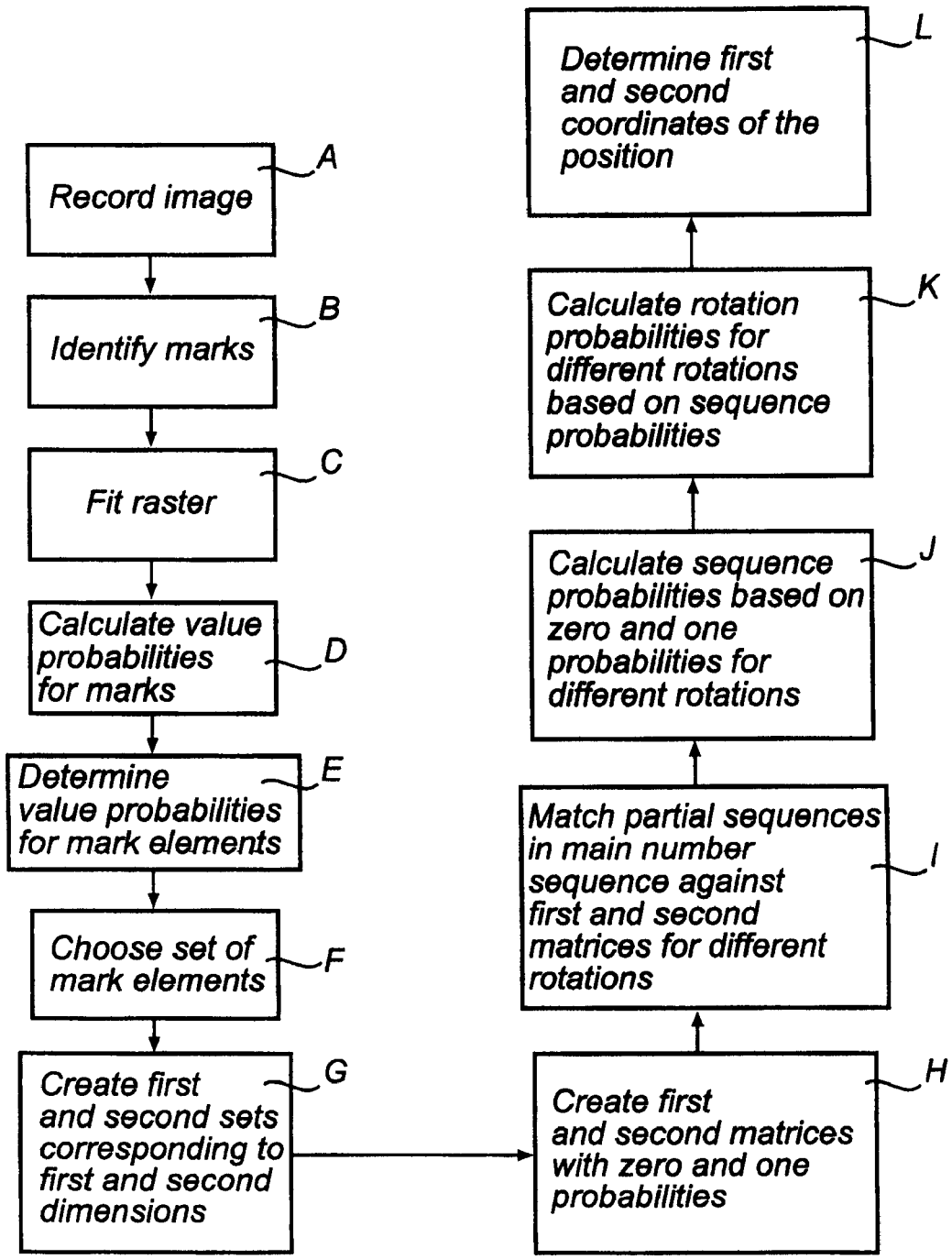
FIG. 10 is a flow chart which shows an example of how an image of a partial area of a position-coding pattern can be decoded to a position.

Now follows a description, with reference to the flow chart in FIG. 10, of an example of how a coding pattern can be decoded by means of probability calculations. The coding pattern to be decoded is of the type described in Applicant's WO 01/26033.

Figure 11A:
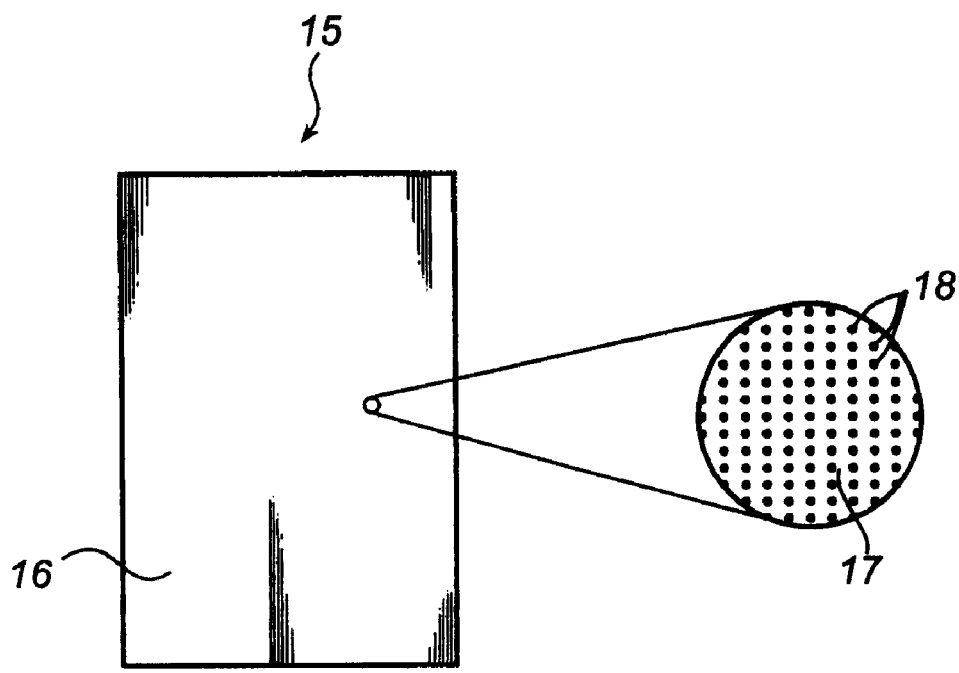
FIG. 11a shows a sheet of paper provided with a position-coding pattern.
Figure 11B:
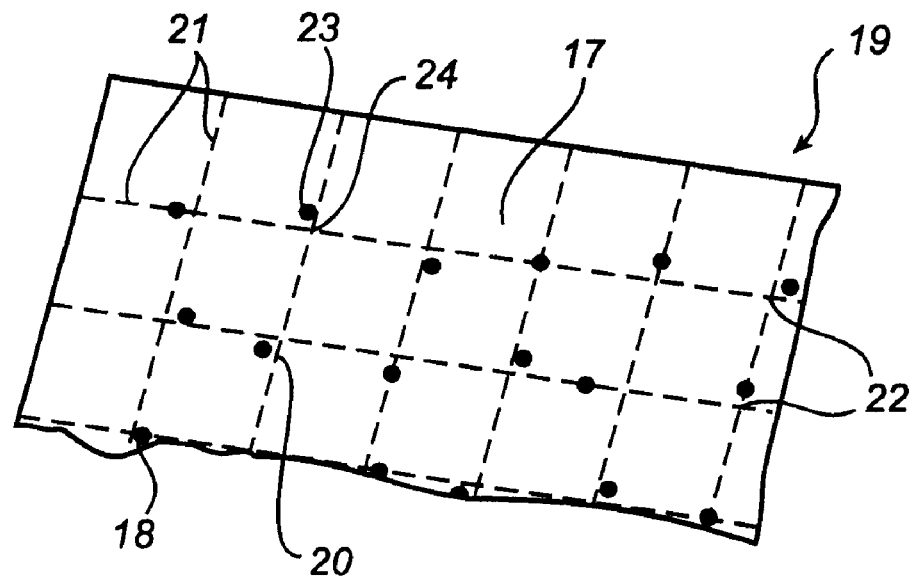
Figure 12:
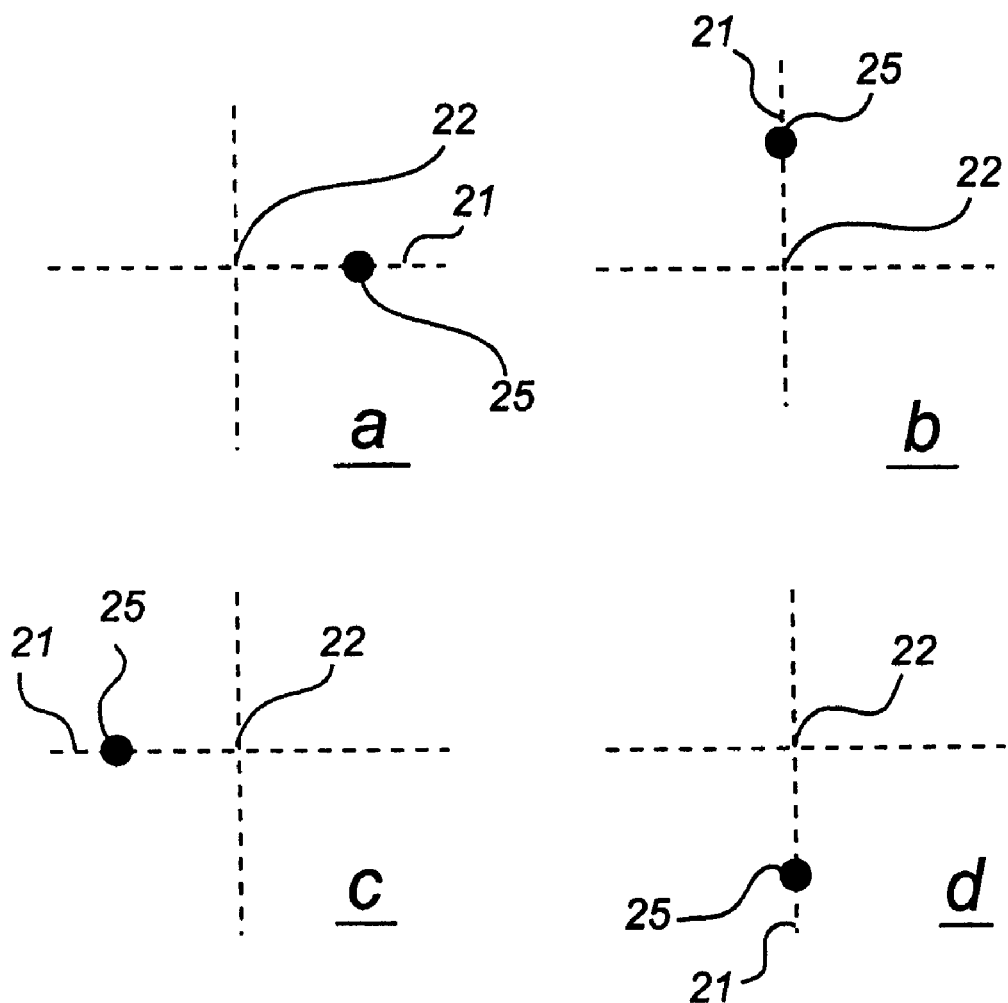
FIG. 12 shows four ideal locations of a mark in a position-coding pattern.
Figure 13:
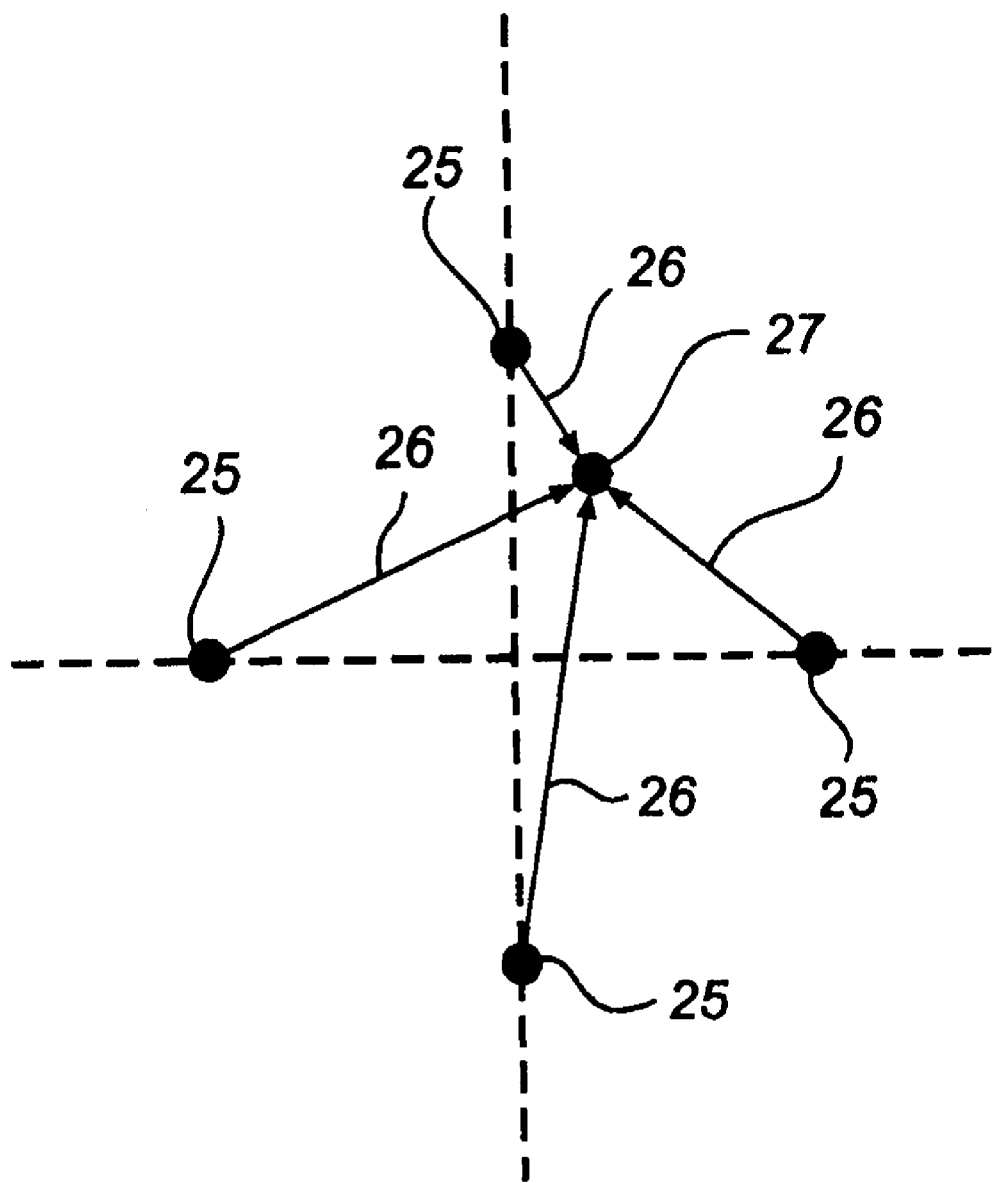
FIG. 13 shows how value probabilities of a mark are calculated.

FIG. 11a shows a sheet of paper 15 that has a surface 16 that is provided with a position-coding pattern (below coding pattern) in the form of an optically readable position code 17. The position code consists of marks 18 and is greatly enlarged for the sake of clarity. FIG. 11b shows a further enlarged part 19 of the position code 17 in FIG. 11a. The device is arranged to record an image of a partial area of the position code (step A), to identify a plurality of marks 18 in the image (step B) and to fit to the image a reference system in the form of a raster (step C) with raster lines 21 that intersect at raster points 22. The fitting is carried out in such a way that each of the marks 18 is associated with a raster point 22. For example, the mark 23 is associated with the raster point 24. Consequently the raster fitting makes it possible to determine to which raster point each mark belongs. In this example, the raster has the form of a square grid, but also other forms are possible. Applicant's Applications WO 01/75783, WO 01/26034 and SE 0104088-0, which are herewith incorporated by reference, disclose in more detail fitting of a raster to marks in an image.

The aim of the preprocessing is to identify all the marks in the image. This can be carried out using thresholds, so that a mark is identified by one or more picture elements (pixels) with a value that exceeds a predetermined or calculated threshold value. The center of gravity is calculated for all such picture elements belonging to a mark and is used in the subsequent processing. Thus, the appearance of the mark in the image has as little effect as possible on the mark's subsequently calculated displacement from the nominal position. The image is then converted to a set of dots by the marks being replaced by unit pulses (so-called Dirac pulses, d) which are placed at the centers of gravity of the marks.

In the "ideal" coding pattern, one and only one mark is associated with each raster point. Owing to deformations and deficiencies in the imaging of the coding pattern, it may be difficult to determine in an image of the coding pattern which marks belong to the coding pattern and which of a plurality of marks is the one that is to be associated with a certain raster point. For this reason, it is possible to associate in this example a plurality of marks with one and the same raster point in the decoding of data. The marks associated with a raster point together form a mark element belonging to the raster point.

In the coding pattern in this example, the value of the marks 18 is defined by their displacement in relation to the raster points 22 with which they are associated. More specifically, it is the position of a point of a mark relative to a raster point that defines the value of the mark. This point is typically the main point of the mark. In the coding pattern in this example, there are four ideal locations for each mark. These locations are on each of the four raster lines 21 extending from the raster point 22 with which the mark is associated. The locations are situated at an equal distance from the raster point. The ideal locations 25 for a mark are shown enlarged in FIGS. 12a-d. They have the value "0" in FIG. 12a, the value "1" in FIG. 12b, the value "2" in FIG. 12c and the value "3" in FIG. 12d. Each mark can thus represent four different values "0-3".

For various reasons, the marks identified in the recorded image often do not have an ideal location. In many cases it can therefore be difficult to unambiguously determine one value for a mark. Because of this, the device is arranged to calculate, for each identified mark, an associated value probability for each value "0-3" that the mark defines this value (step D). The value probabilities for each mark are a decreasing function of the distances 26 from the mark 27 to each of its ideal locations 25, see FIG. 13, or more specifically, typically from the main point of the mark 27 to each ideal location. The marks can be assumed to be normally distributed around the ideal locations. This means that the value probabilities, $P(d_i)$, can be calculated by the formula $P(d_i)=k \exp(-(d_i)^2/v)$, where k=a constant, $d_i$=the distance from a mark to an ideal location and v=a constant, in this example the variance of the distance. The variance can be determined empirically. Four value probabilities can thus be calculated for each mark. It sometimes happens that a mark is found in the center of a raster point. In these cases, the four value probabilities for the mark will be equal, since the distances from the mark to each of the ideal locations are equally large. The case when there is no mark associated with a raster point, i.e. the associated element contains zero marks, is treated as if there was a mark in the center of the raster point, that is the value probabilities are equal.

If there is more than one mark, for example three, associated with a raster point, i.e. three marks in the associated mark element, there are a total of 3×4 value probabilities for the raster point or mark element. The device is therefore arranged to determine, for each raster point or mark element and for each value, a value probability that the marks associated with the raster point together define this value (step E). These value probabilities for a raster point could thus also be called raster point probabilities. By calculating the value probabilities for the raster points, all the marks in the recorded image may be taken into consideration in the position determination and the risk of information being lost is minimized. Since the above means that for each mark element, value probabilities are calculated that the element defines each of the values, the values "0"-"3" are called mark element values in the rest of the description.

The value probabilities for a mark element can be determined by the value probabilities for the marks in the mark element being compared, the highest value probability being selected for each possible mark element value. Alternatively, the value probabilities for the mark element can be weighted sums of the value probabilities for each of the possible mark element values for the marks in the mark element. The value probabilities for the mark element can, of course, also be determined in other ways than those mentioned above.

Figures 14A, 14B, 14C:
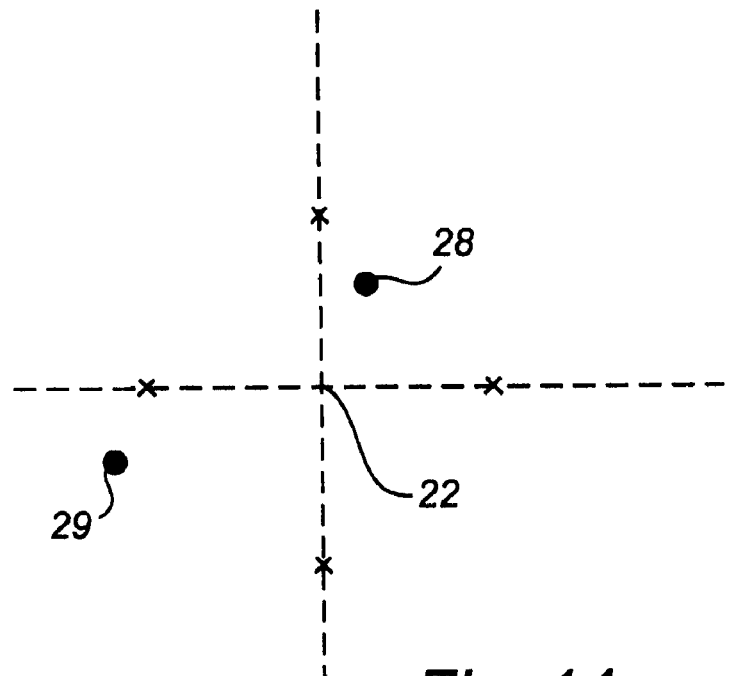
FIGS. 14a-c show how value probabilities for an element are calculated.
Figure 18:
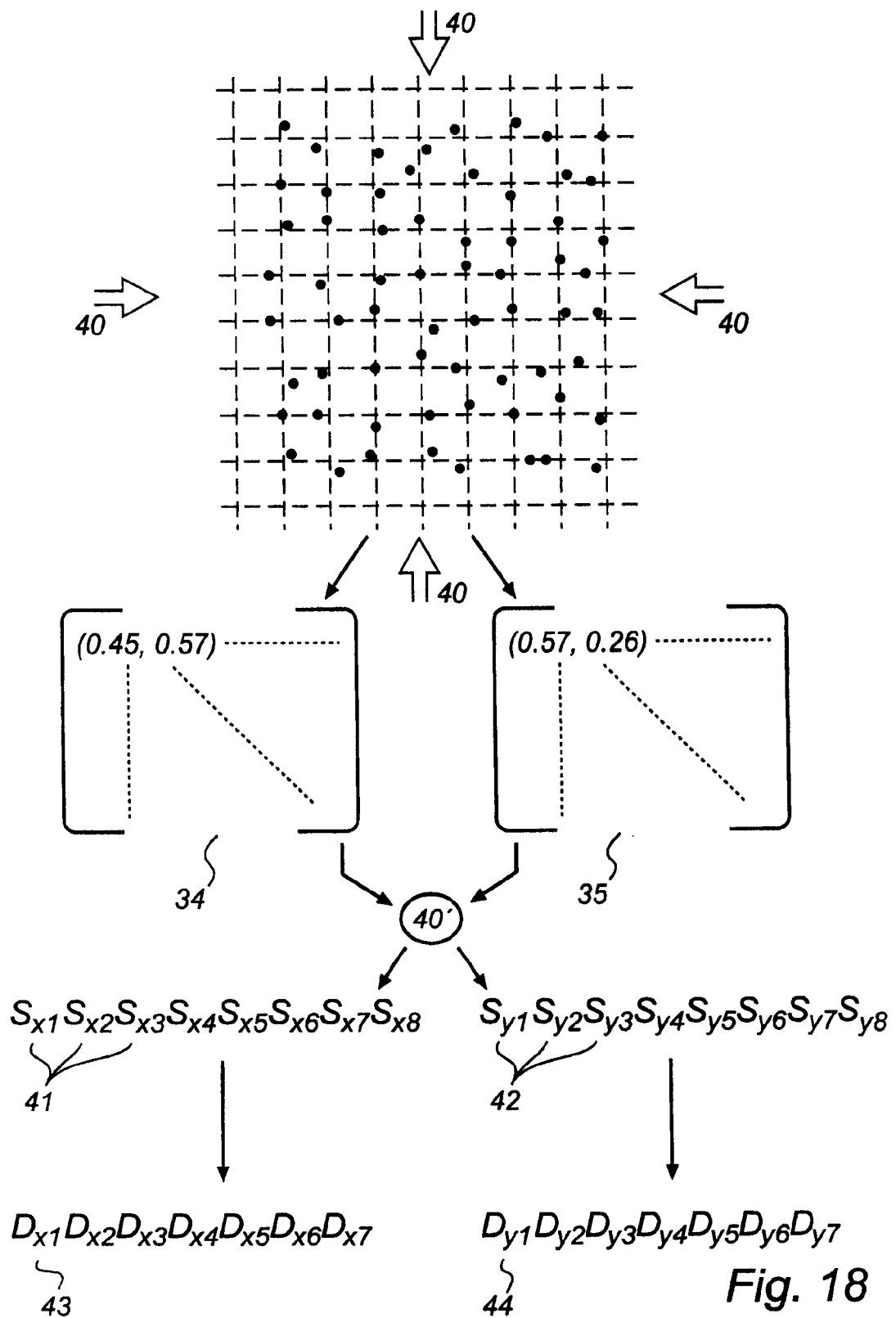
FIG. 18 illustrates steps in the decoding of the position-coding pattern.
Figure 19:
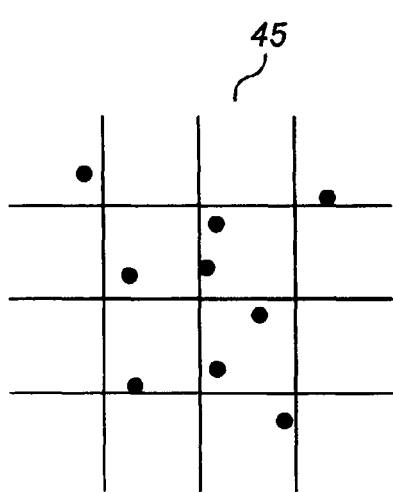
FIG. 19 illustrates rotation of a position-coding pattern.
Figure 19:
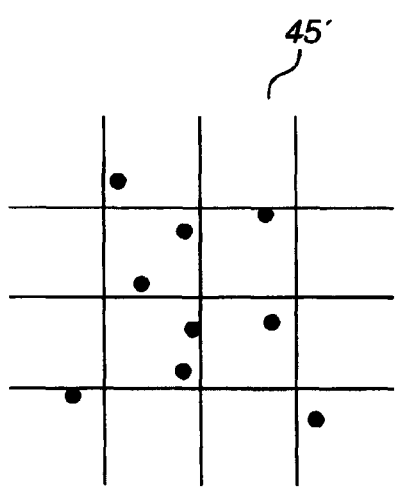

Calculation of the value probabilities for a mark element in this example is illustrated by means of the number example in FIG. 14. FIG. 14a shows a raster point 22 with two associated marks 28 and 29. The marks 28 and 29 together constitute the mark element belonging to the raster point 22. The Tables 30 and 31 in FIG. 14b contain the value probabilities $P_1$ for the possible values of the respective marks. The Table 32 in FIG. 14c contains the resulting value probabilities $P_2$ for the possible mark element values of the mark element. In this example, the value probabilities for the mark element are relative. Alternatively, they can instead by normalized in a suitable way. If there is only one mark associated with a raster point, i.e. one mark in the associated mark element, the value probabilities for the mark and the mark element are obviously the same.

When recording an image, the distance from the device to the surface influences how large a part of the position code is recorded and thereby also how large a raster can be fitted to the image. For converting the image into a position, a predetermined number of mark elements is used, which in this example is 8×8 mark elements. If more than 8×8 raster points have been fitted to the image, an excess of mark elements is thus identified. The device is therefore further arranged to choose, from all the identified mark elements, the set of mark elements that provides the most information about the position on the surface (step F). This set of mark element is, but need not be, continuous. The mark elements in the set of mark elements correspond in this example to a raster point matrix with raster points fitted to the image, but this is not a requirement. In other words, the purpose is to select the mark elements with associated value probabilities for each mark element value which maximize an information measure for the recorded image. For this purpose, an entropy is calculated for each of the identified mark elements. Thereafter the 8×8 mark elements are chosen that give the smallest entropy sum, which corresponds to the maximum information measure for the recorded image. If the value probabilities for the mark elements are normalized so that $$\sum_i P_{2,i} = 1,$$

the entropy H for a mark element is calculated according to the following formula:

$$H = -\sum_i P_{2,i} \log_2(P_{2,i})$$

where $P_{2,i}$ is the value probability of the mark element for the mark element value i (i=0, 1, 2, 3) and where $\log_2$ is the two-logarithm. The entropy for a mark element is thus maximal when its value probabilities are equally high and minimal when all except one of the value probabilities are zero. An alternative to choosing 8×8 mark elements by means of entropy calculations is instead to use the highest value probability for each mark element as an information value. In this case, the continuous 8×8 mark elements are selected which maximize an information measure that consists of the sum of the information values for the 8×8 mark elements.

The coding pattern used in this example codes, as mentioned, two coordinates for a point on the surface 4. These coordinates are separately decodable. Therefore they can be called data in two dimensions. Each mark in the coding pattern codes more specifically a first bit which is used to decode the first coordinate and a second bit which is used to decode the second coordinate.

In the decoding of the coding pattern in the recorded image, each possible mark element value "0"-"3" for a mark element is therefore converted into a first and a second decoding value which in this example thus are binary. The device is thus arranged to convert, for each of the 8×8 mark elements in the set of mark elements, the mark element values "0"-"3" into the four different bit combinations (0, 1), (0, 0), (1, 0) and (1, 1). The bit combinations have the value probabilities belonging to the mark element values, for each mark element, see the continuation of the previous number example in Table 33 in FIG. 15a. In the bit combinations, the first bit, i.e. the first decoding value, refers to the first dimension and the second bit, i.e. the second decoding value, to the second dimension. The value probability $P_2$ for the corresponding mark element value is associated with the first and second decoding values. The set of mark elements can thus be used to create a first set of first decoding values with associated value probabilities for the first dimension, and a second set of second decoding values with associated value probabilities for the second dimension (step G). Table 33 describes a mark element in the set of mark elements. The Tables 33' and 33" contain the corresponding first decoding values in the first set with associated value probabilities and respectively the second decoding values in the second set with associated value probabilities. Each of the first and the second decoding values is, as is evident from that stated above, either a zero or a one.

The device is arranged to associate for each mark element in the set of mark elements each of the different possible first decoding values in the first set with one value probability, and each of the different possible second decoding values in the second set with one value probability. Since the possible first and second decoding values in this example are zero and one, the above results in one value probability for the decoding value zero and one for the decoding value one in the first and second sets for each mark element in the set of mark elements. In the following, the value probability for the decoding value zero is called zero probability and the value probability for the decoding value one is called one probability.

Referring to Table 33', in this example, the above is carried out for each of the mark elements in the set of mark elements by comparing the value probabilities in the first set that correspond to the first decoding value being a zero. Then the highest value probability is chosen as zero probability and is saved in a first matrix 34. In the same way, the value probabilities in the first set that correspond to the first decoding value being one, are compared. Then the highest value probability is chosen as one probability and is also saved in the first matrix 34. Referring to Table 33", the above procedure is subsequently repeated for the value probabilities in the second set, the second decoding values and a second matrix 35. The first and the second sets are thus used to create a first and second matrix with zero and one probabilities (step H). The result is illustrated in the continuation of the number example in FIG. 15b. Alternatively, a first and a second matrix with zero and one probabilities for the 8×8 elements in the set of elements are created by the value probabilities in the first set that correspond to the first decoding value being zero being added, the sum being stored as the zero probability, and by the value probabilities in the first set that correspond to the first number being one being added, the sum being stored as the one probability. The procedure is then repeated for the value probabilities in the second set and the second decoding values.

Thus the 8×8 mark elements in the set of mark elements now correspond to two matrices 34 and 35, each with 8×8 matrix elements, where each of the matrix elements contains one zero probability and one probability. By means of these first and second matrices, coordinates can be determined for the position.

An alternative to choosing the set of mark elements after the determination of the value probabilities for all mark elements in the recorded image is to wait until matrices corresponding to the matrices 34 and 35 have been determined for all the identified mark elements. In this case, 8×8 matrix elements in each matrix can then be selected based on the corresponding zero and one probabilities. One way of doing this is to select 8×8 matrix elements in which one of the zero and one probabilities is high and the other low. In this case, the matrix elements corresponding to the same mark elements need not be selected for determination of both coordinates, the calculations proceeding with different corresponding mark elements for the two matrices.

In this example the position code is in the first dimension based on a first cyclic main number sequence. This gives a condition for the relation between the mark element values of the mark elements. The first cyclic main number sequence has the property that the place therein for each partial sequence of a predetermined length is unambiguously determined. In this example the predetermined length is 6. If thus 6 succeeding numbers are taken in an arbitrary place in the first cyclic main number sequence, these six numbers occur only once in the first main number sequence in this succession. The property also applies if the end of the first main number sequence is connected to the beginning of the first main number sequence. Therefore, the first main number sequence is called cyclic. In this example a binary main number sequence is used. If the place for a partial sequence with six numbers is to be unambiguously determined, the first main number sequence can then maximally have the length $2^6=64$ and the partial sequences of the length 6 can have places 0-63 in the first main number sequence. If, however, a first main number sequence of the length 63 is chosen, it is possible, as will be evident from the following, to provide improved error correction properties. In the following, it will thus be assumed that the length of the first main number sequence is 63 and that it thus defines unique places in the range 0-62.

FIG. 16 shows an example of a first cyclic main number sequence that can be used in connection with the position coding. The partial sequence 0,0,0,0,0,0 has, for instance, the unambiguous place 0, the partial sequence 1,1,1,1,1,0 the unambiguous place 9 and the partial sequence 1,1,1,0,1,0 the unambiguous place 11 in the first main number sequence. For determining a position on the surface, 6×6 mark elements must be identified in the recorded image. As discussed above, however, use is made of 8×8 mark elements for a position determination and the reason for this will be evident from the following. As stated above, the first cyclic main number sequence, on which the position code is based in the first dimension, has the property that it contains merely mutually unique partial sequences of the length 6. Consequently, also the place in the first cyclic main number sequence for each partial sequence of the length 8 is unambiguously determined. This fact it utilized in the determination of the coordinates for the position on the surface.

The device is arranged to match each of the unique partial sequences of the length 8 in the first cyclic main number sequence with each of the columns in the first matrix 34 (step I). The method is illustrated in FIG. 17. The Figure shows an example of a binary partial sequence 36 of the length 8 and a column 37 in the first matrix 34 (FIG. 15b), said column having matrix elements which each contain a zero probability and a one probability corresponding to the first decoding value being zero and one respectively. For each matrix element, one of the zero and one probabilities is selected depending on the corresponding number in the partial sequence 36. The first number in the partial sequence 36 is, for instance, zero, which means that the zero probability is selected for the first matrix element in the column 37. The second number in the partial sequence is one, which means that the one probability is selected for the second matrix element in the column 37. For each partial sequence in the first main number sequence, for each column in the first matrix 34, the device is in addition arranged to calculate a first sequence probability (step J) by multiplication of the correspondingly selected zero and the one probabilities for the matrix elements. In FIG. 17, the first sequence probability 38 corresponding to the partial sequence 36 and the column 37 has been calculated. After this operation, there will thus be 63 first sequence probabilities with a respective associated unique sequence value for each column in the first matrix 34. These sequence values are defined by the places of the corresponding partial sequences in the first cyclic main number sequence. The device is arranged to select for each column the highest first sequence probability and the corresponding sequence value and save these.

The position code in the second dimension is here based on a second cyclic main number sequence which in this example has the same properties as the first cyclic main number sequence.

The device is further arranged to match, in a manner corresponding to that above, each of the unique partial sequences of the length 8 in the second cyclic main number sequence with each of the rows in the second matrix 35. The rows in the matrix 35 have, just like the columns in the matrix 34, matrix elements which each contain one zero probability and one probability corresponding to the second decoding value being zero and one respectively. For each matrix element, one of the zero and one probabilities is selected depending on the corresponding number in a partial sequence in the second cyclic main number sequence. For each partial sequence in the second main number sequence, for each row in the second matrix 35, the device is further arranged to calculate a second sequence probability (step J) by multiplication of the correspondingly selected zero and one probabilities for the matrix elements. After this operation, there will thus be 63 second sequence probabilities with a respective associated unique sequence value for each column in the second matrix 35. These sequence values are defined by the places of the corresponding partial sequences in the second cyclic main number sequence. The device is further arranged to select for each row the highest second sequence probability and the corresponding sequence value and save these.

The position code used in this example is based on use of different rotations or circular shifts of the cyclic main number sequences. In order to code positions in, for instance, the x direction, the first main number sequence is printed or arranged in some other manner rotated or circularly shifted in different ways in columns across the surface, i.e. in the y direction orthogonally to the direction in which positions are to be coded, from above and down. The main number sequence may be printed repeatedly in the same column, which is necessary if more positions than what corresponds to the length of the main number sequence are to be coded in the y direction. The same rotation of the main number sequence is then used in all repetitions. This means that different rotations can be used in different columns.

Each pair of adjoining columns defines a difference number D. The difference number D is given by the difference between the places in the main number sequence for the first partial sequence in each column. If instead the difference between the places for the partial sequences is taken one step down in the columns, the result will be the same as the places will be offset in the same way. The difference number D will thus always be the same independently of at what "height" in the columns the places of the partial sequences in the main number sequence are compared. For each pair of columns, the difference number D is thus constant in the y direction. The difference numbers between adjoining columns form a set of difference numbers than can be used to obtain a coordinate for a position on the surface in the first dimension.

The position code in a second direction, for instance in the y direction in this case, can be based on the same principle as the position code in the first dimension. The second main number sequence is then arranged with different circular shifts in rows on the surface, i.e. in the x direction, from the left to the right. Difference numbers are defined between adjoining rows and these difference numbers form a set of difference numbers that can be used to obtain a coordinate for a position on the surface in the second dimension.

Thus the position code consists of one partial position code for the first direction and one partial position code for the second direction.

As is evident from that stated above, the partial sequences are not written with their explicit values, but with a graphical coding. In the graphical coding, marks define a superposing of the partial position codes.

Since the position code is based on main number sequences which are arranged in predetermined directions on the surface, the marks must be decoded in these directions for the position determination to be correct. The correct decoding directions are, as mentioned above, from above and down and from the left to the right.

A device for data decoding can, when recording an image, be held rotated in different locations relative to the surface and the position code. There are four possible recording rotations which are shown as arrows 40 in FIG. 18. The recorded image of the position code does not in itself reveal the relative rotation between the position code and the device since the position code has essentially the same appearance if it is rotated through 0, 90, 180 or 270 degrees. When the position code has been rotated, the direction of the displacement of each mark in relation to the raster point with which it is associated will, however, be changed. This results in turn in the bit combination (first decoding value, second decoding value) which codes the displacement of the mark being changed. With the "correct" rotation of the position code, the marks are arranged in the correct decoding directions from above and down in the columns as well as from the left to the right in the rows. If the correct rotation of the position is zero, the following applies to the incorrect rotations:

- 90 degrees clockwise: the columns with marks in the "correct" rotation, which marks are arranged from above and down, will be rows with marks arranged from the right to the left, i.e. in the incorrect decoding direction, and the rows with marks in the "correct" rotation, which marks are arranged from the left to the right, will be columns with marks arranged from above and down, i.e. in the correct decoding direction.
- 180 degrees: the columns with marks in the "correct" rotation will be columns with marks arranged from below and up, i.e. in the incorrect decoding direction, and the rows with marks in the "correct" rotation will be rows with marks arranged from the right to the left, i.e. in the incorrect decoding direction.
- 270 degrees clockwise: the columns with marks in the "correct" rotation will be rows with marks arranged from the left to the right, i.e. in the correct decoding direction, and the rows with marks in the "correct" rotation will be columns with marks arranged from below and up, i.e. in the incorrect direction.

If the marks in the columns and the rows are arranged in the incorrect decoding direction, the zero and one probabilities for each element will be inverted when decoded.

Therefore the device is arranged to test, as will be described below, different rotations of the partial area of the position code in the recorded image. The operation that was carried out on the first and the second matrix 34 and 35, respectively, i.e. the matching of the partial sequences in the cyclic main number sequences against columns and rows respectively in the matrices (step I), the calculation of sequence probabilities (step J), and the selection of the highest sequence probabilities with corresponding sequence values for the columns and the rows respectively, is carried out also on the first and the second matrix 34 and 35 rotated through 180 degrees and "inverted", which matrices in FIG. 15c are designated 34' and 35' respectively. These rotated, inverted matrices 34' and 35' correspond to an inverted version of the partial area of the position code in the recorded image. The reason for this is explained in FIG. 19 which shows an example of a partial area of a position code in a recorded image. In the Figure, only 9 marks are used for the sake of simplicity which are each associated with one raster point for the illustration. The position code 45 is the one recorded in the image. The position code 45' is the same position code inverted. The matrices 46 and 47 correspond to the matrices 34 and 35 respectively for the position code 45 turned the right way round, and the matrices 48 and 49 correspond to the matrices 34' and 35' respectively for the inverted position code 45'. If the matrices 48 and 49 for the inverted position code are rotated through 180 degrees and inverted, the matrices 46 and 47 will be obtained for the position code turned the right way around. By inversion is in this context meant that the zero and one probabilities in each matrix element change places.

After the above procedure, there is a highest sequence probability with a corresponding sequence value for each column in the matrices 34 ad 34', and for each row in the matrices 35 and 35'. For each of the matrices 34, 34', 35 and 35', the device is then arranged to calculate a rotation probability (step K) by multiplication of the corresponding highest sequence probabilities. Based on the sequence values corresponding to the highest sequence probabilities for that of the matrices 34 and 34' which corresponds to the highest rotation probability, and the sequence values corresponding to the highest sequence probabilities for that of the matrices 35 and 35' which corresponds to the highest rotation probability, coordinates for the position can be calculated.

As described above, it is not necessary to examine all four rotations. This is simply explained by means of an example. Now assume that the partial area of a position code in an image that is recorded is the one (45) shown in FIG. 19. Further assume that the "correct" rotation of the position code is rotated through 90 degrees clockwise relative to the recorded one. According to the above description, where the correct rotation is assumed to correspond to a rotation through 0 degrees, this means that the position code 45 in the recorded image is rotated through 270 degrees clockwise relative to the "correct" rotation. Consequently, the position code 45' is rotated through 90 degrees clockwise relative to the "correct" rotation. In the manner described above, the position codes 45, 45' are now decoded in FIG. 19. The columns with marks in the "correct" rotation through 0 degrees are, as described above, arranged in the correct decoding direction in the position code 45. The correct direction causes the sequence probabilities, and consequently the rotation probability, corresponding to these rows, to be high. The rows with marks in the correct rotation are, as described above, columns arranged in the incorrect decoding direction in the position code 45. The incorrect direction combined with the inversion causes the value probabilities, and consequently the rotation probability, corresponding to these columns, to be low. The relationship will be the opposite for the position code 45'. The columns with marks in the correct rotation through 0 degrees are, as described above, rows arranged in the incorrect decoding direction in the position code 45'. The incorrect direction causes the sequence probabilities, and consequently the rotation probability, corresponding to these rows, to be low. The rows with marks in the correct rotation are, as described above, columns arranged in the correct decoding direction in the position code 45'. The correct direction causes the sequence probabilities, and consequently the rotation probability, corresponding to these columns, to be high.

When recording the "correct" rotation of the position code, columns and the rows will, as mentioned above, extend in the "correct" direction in the image. This means for the example in FIG. 15 that the rotation probabilities for the matrices 34 and 35 will both be higher than the rotation probabilities for the matrices 34' and 35'. This is an indication that the "correct" rotation of the position code has been recorded. Thus, a first coordinate can be calculated based on the sequence values corresponding to the highest sequence probabilities for the matrix 34, and a second coordinate can be calculated based on the sequence values corresponding to the highest sequence probabilities for the matrix 35.

When recording the position code rotated through 180 degrees in relation to the "correct" rotation, the columns and the rows will extend in the "incorrect" direction in the image. This means for example in FIG. 15 that the rotation probabilities for the matrices 34' and 35' will both be higher than the rotation probabilities for the matrices 34 and 35. This is an indication that the position code has been recorded in the rotation through 180 degrees in relation to the "correct" rotation. Thus, a first coordinate can be calculated based on the sequence values corresponding to the highest sequence probabilities for the matrix 34', and a second coordinate can be calculated based on the sequence values corresponding to the highest sequence probabilities for the matrix 35'.

Recording of the position code rotated through 90 or 270 degrees clockwise in relation to the "correct" rotation is indicated by the highest rotation probabilities not belonging to the same rotation. If it is assumed that the matrices 34 and 35 in FIG. 15 originate from a position code which is rotated through 90 degrees clockwise in relation to the correct direction, the rotation probability for the matrix 34 will be higher than the rotation probability for the matrix 34', and the rotation probability for the matrix 35 will be lower than the rotation probability for the matrix 35'. In this case, the second coordinate is calculated based on the sequence values corresponding to the highest sequence probabilities for the matrix 34, and the first coordinate is calculated based on the sequence values corresponding to the highest sequence probabilities for the matrix 35'. If it is assumed instead that the matrices 34 and 35 in FIG. 15b originate from a position code which is rotated through 270 degrees clockwise in relation to the correct direction, the second coordinate is instead calculated based on the sequence values corresponding to the highest sequence probabilities for the matrix 34', and the first coordinate is calculated based on the sequence values corresponding to the highest sequence probabilities for the matrix 35.

What allows the detection of the rotation of the position coding in the recorded image thus is the fact that the rotation probability for a matrix is changed when the matrix is rotated through 90, 180 or 270 degrees. If the rotation of the position code is different from zero, i.e. if the rotation of the position code in the recorded image is incorrect, the rotation probability as stated above will be low. This depends on the fact that the unique partial sequences of the length 8 in the cyclic main number sequences do not occur inverted or reverse in the main number sequences. If such a condition should be satisfied for the main number sequences for partial sequences of the length 6, it would mean that the main number sequences would be reduced significantly, which in turn would imply that fewer positions could be coded. This is thus one reason why 8×8 mark elements are used for the position determination although only 6×6 are theoretically required.

The same basic principles as the ones used in the rotation detection can be used for error correction. For instance, the main number sequence can be selected so that partial sequences of a predetermined length, which is longer than the one required for position determination, do not occur with one bit inverted in the main number sequence. Then, if all bits except one in such a longer partial sequence can be detected with certainty, the incorrect bit can be corrected. This is another reason why 8×8 mark elements are used for the position determination although only 6×6 are theoretically required.

Thus, by an intelligent selection of the main number sequence, the error detection and error correction properties of the coding pattern can be considerably improved.

The property of the cyclic main number sequences that partial sequences of the length 8 do not occur inverted or reverse can, however, not be provided for a 64 bit long main number sequence, which is the reason why the length of the main number sequences has instead been selected to be 63.

In decoding, redundant information is thus used to obtain error correction properties. In the example described above, 8×8 mark elements are used in the decoding, although the position information can be extracted based on 6×6 raster points, i.e. there is 56 bit redundant information [$(8^2-6^2)\times 2$] for determining the position. In decoding, information in the current image is matched, by columns and by rows, with the different partial sequences that may occur in the position code, while using the value probabilities belonging to the current image. The combination of redundant information, probabilities and a known condition for the relation between the values of the mark elements gives good insensitivity to interference in the current image. The value of each individual mark thus decreases in importance since the value of the individual mark must correspond to the other values in that of the partial sequences which gives the highest sequence probability.

If the need for error correction is more limited, the device can alternatively be arranged to directly select, for each of the columns in the first matrix, and for each of the rows in the second matrix, a sequence, and thus a sequence value, corresponding to the highest of the zero and one probability for each mark element.

When the rotation 40' of the recorded position code in relation to the "correct" rotation has been established, the first and second coordinate of the position can thus be determined (step L). This is carried out as described above, based on sequence values which in FIG. 18 are designated $Sx_1$-$Sx_8$ (41) for the first coordinate and $Sy_1$-$Sy_8$ (42) for the second coordinate.

The device is arranged to calculate for the sequence values $Sx_1$-$Sx_8$ and $Sy_1$-$Sy_8$ differences between adjacent sequence values, which results in two sets, 43 and 44, of seven difference numbers $Dx_1$-$Dx_7$ and $Dy_1$-$Dy_7$ each. These difference numbers are then used to generate a first coordinate and a second coordinate.

For the calculation of the first coordinate, however, only six of the sequence values $Sx_1$-$Sx_8$, i.e. five of the difference numbers $Dx_1$-$Dx_7$, are necessary as described above. According to this example, the sequence values $Sx_2$-$Sx_7$ and thus the difference numbers $Dx_2$-$Dx_6$ are used. The same applies to the second coordinate that is then calculated from the sequence values $Sy_2$-$Sy_7$ and thus the difference numbers $Dy_2$-$Dy_6$. Alternatively, only six sequence values are determined for each direction, $Sx_2$-$Sx_7$ and $Sy_2$-$Sy_7$.

The conversion from difference numbers to coordinates can be carried out in many ways, for example in the way that is described in Applicant's applications WO 01/26033, which is herewith incorporated by reference.

In the example described above, 8×8 mark elements have been identified, for data decoding, in a recorded image. However, it may sometimes happen that it is not possible to identify so many mark elements. "Empty" additional mark elements are then added to the mark elements that can be identified in the image to obtain a total of 8×8 mark elements. As described earlier, the value probabilities for an "empty" mark element are all equal.

We claim:

1. A method of coding positions in two dimensions on a surface, comprising:
    coding positions along an x-axis using a first difference number sequence having the property that each partial sequence of a predetermined length has an unambiguously determined place within the first difference number sequence, each position along the x-axis being coded by one of said partial sequences,
    coding positions a long a y-axis using a second difference number sequence having the property that each partial sequence of a predetermined length has an unambiguously determined place within the second difference number sequence, each position along the y-axis being coded by one of said partial sequences,
    coding the numbers of the first difference number sequence by differences in circular shifts between instances of a first main number sequence running orthogonally to the first difference number sequence; and
    coding the numbers of the second difference number sequence by differences in circular shifts between instances of a second main number sequence running orthogonally to the second difference sequence.

2. The method as claimed in claim 1, wherein the first and second difference number sequences are identical.

3. The method as claimed in claim 1, wherein the first and second main number sequences are identical.

4. The method as claimed in claim 1, wherein a base of at least one of the first and second difference number sequences is greater than two.

5. The method as claimed in claim 1, wherein at least some of the differences in circular shifts between adjacent instances of one of the main number sequences are greater than one.

6. The method as claimed in claim 1, wherein the first and second main number sequences are binary.

7. The method as claimed in claim 1, wherein the position code is graphically coded on the surface using a plurality of substantially similar marks.

8. The method as claimed in claim 7, wherein each mark is a dot.

9. The method as claimed in claim 7, wherein each mark codes one bit from the first main number sequence and one bit from the second main number sequence.

10. The method as claimed in claim 7, wherein each one of said plurality of substantially similar marks is displaced from a nominal position defined by a regular grid.

11. The method as claimed in claim 7, wherein each one of said plurality of substantially similar marks codes one bit from the first main number sequence and one bit from the second main number sequence and is displaced in one of four predetermined directions from a nominal position defined by a regular grid.

12. The method as claimed in claim 1, wherein each position along the x-axis is defined by five difference numbers.

13. The method as claimed in claim 1, wherein each one of the first and the second main number sequences has the property that each partial sequence of a first predetermined length has an unambiguously determined place within the first main number sequence and the second main number sequence, respectively.

14. The method as claimed in claim 13, wherein the predetermined length of the partial sequence of the first and second main number sequences is six numbers.

15. The method as claimed in 13, wherein at least one of the first and the second main number sequences has the property that each partial sequence of a second predetermined length has an unambiguously determined place within the main number sequence, but does not occur backwards in the main number sequence.

16. The method as claimed in 13, wherein at least one of the first and the second main number sequences has the property that each partial sequence of a second predetermined length has an unambiguous place within the main number sequence, but does not occur inverted in the main number sequence.

17. The method as claimed in 13, wherein at least one of the first and the second main number sequences has the property that each partial sequence of a second predetermined length has an unambiguously determined place within the main number sequence, but does not occur with one bit inverted in the main number sequence.

18. A method for decoding a subset of a position code, which subset codes an x-coordinate and a y-coordinate for at least one point on a surface, comprising:
   receiving a digital representation of the subset of the position code,
   identifying, based on said digital representation, first partial sequences of instances of a first main number sequence which run perpendicularly to an x-axis of the position code and second partial sequences of instances of a second main number sequence which run perpendicularly to a y-axis of the position code,
   determining, based on the first partial sequences, first differences in circular shifts between instances of the first main number sequence, said first differences constituting a partial sequence of a first difference number sequence, which defines the x-axis and has the property that any partial sequence of predetermined length in the first difference number sequence has an unambiguously determined place within the first difference number sequence and codes an x-coordinate;
   determining the x-coordinate for said at least one point using the partial sequence of the first difference number sequence;
   determining, based on the second partial sequences, second differences in circular shifts between instances of the second main number sequence, said second differences constituting a partial sequence of a second difference number sequence, which defines the y-axis and has the property that any partial sequence of predetermined length in the second difference number sequence has an unambiguously determined place within the second difference number sequence and codes a y-coordinate; and
   determining the y-coordinate for said at least one point using the partial sequence of the second difference number sequence.

19. A method as claimed in claim 18, wherein the first and second difference number sequences are identical.

20. A method as claimed in claim 18, wherein the first and second main number sequences are identical.

21. A method as claimed in claim 18, wherein a base of at least one of the first and second difference number sequences is greater than two.

22. A method as claimed in claim 18, wherein at least some of the differences in circular shifts between adjacent instances of the main number sequences are greater than one.

23. A method as claimed in claim 18, wherein each one of the first and second main number sequence has the property that any partial sequence of predetermined length in the cyclic main number sequence is unique within the main number sequence.

24. A method as claimed in claim 18, further comprising determining a rotation of the subset of the position code for which the determination of the x-coordinate and the y-coordinate is to be carried out.

25. A method as claimed in claim 18, wherein the rotation is determined using the fact that each one of the first and second main number sequences has the property that any partial sequence of a predetermined length of the cyclic main number sequence has an unambiguous place within the main number sequence, but does not occur backwards and inverted in the main number sequence.

26. A method as claimed in claim 18, further comprising using table look-ups for determining the x-coordinate and the y-coordinate.

27. A method as claimed in claim 18, wherein determining the x-coordinate comprises converting the partial sequence of the first difference number sequence to a plurality of partial sequences of a set of secondary difference number sequences having smaller bases than the base of the first difference number sequence.

28. A method as claimed in claim 18, further comprising determining at least one additional coordinate by determining the circular shift of a first instance of the main number sequence running perpendicularly to the x-axis or the y-axis in the position code.

29. A device for decoding a subset of a position'code, which subset codes an x-coordinate and a y-coordinate for at least one point on a surface, comprising a processor configured to identify, based on a digital representation of the position code, first partial sequences of instances of a first cyclic main number sequence which run perpendicular to an x-axis of the position code and second partial sequences of instances of a second cyclic main number sequence which run perpendicularly to a y-axis of the position code; to determine, based on the first partial sequences, first differences in circular shifts between instances of the first cyclic main number sequence, said first differences constituting a partial sequence of a first difference number sequence, which defines the x-axis and has the property that any partial sequence of predetermined length in the first difference number sequence has an unambiguously determined place in the first difference number sequence and codes an x-coordinate; to determine the x-coordinate for said at least one point using the partial sequence of the first difference number sequence; to determine, based on the second partial sequences, second differences in circular shifts between instances of the second cyclic main number sequence, said second differences constituting a partial sequence of a second difference number sequence, which defines the y-axis and has the property that any partial sequence of predetermined length in the second difference number sequence has an unambiguously determined place in the second difference number sequence and codes a y-coordinate, and to determine the y-coordinate for said at least one point using the partial sequence of the second difference number sequence.

30. A device as claimed in claim 29, further comprising a sensor for providing the digital representation of the subset of the position code to be decoded.

31. A device as claimed in claim 29, wherein the first and second difference number sequences are identical.

32. A device as claimed in claim 29, wherein the first and second main number sequences are identical.

33. A device as claimed in claim 29, wherein a base of at least one of the first and second difference number sequences is greater than two.

34. A device as claimed in claim 29, wherein at least some of the differences between adjacent instances of the main number sequences are greater than one.

35. A device as claimed in claim 29, wherein each one of the first and second main number sequence has the property that any partial sequence of predetermined length in the cyclic main number sequence has an unambiguously determined place in the main number sequence.

36. A device as claimed in claim 35, further comprising a memory storing a table that converts partial sequences of the first and second main number sequences into places in the main number sequences.

37. A device as claimed in claim 29, wherein the processor is further configured to convert the partial sequence of the first difference number sequence to a plurality of partial sequences of a set of secondary difference number sequences having smaller bases than the base of the first difference number sequence.

38. A device as claimed in claim 29, wherein the processor is further configured to determine a rotation of the subset of the position code for which the determination of the x-coordinate and the y-coordinate is to be carried out.

39. A device as claimed in claim 38, wherein the processor is configured to determine the rotation using the fact that each one of the first and second main number sequences has the property that any partial sequence of a predetermined length of the cyclic main number sequence has an unambiguously determined place in the cyclic main number sequence, but does not occur backwards and inverted in the cyclic main number sequence.

40. A device as claimed in claim 29, wherein the processor is further configured to determine at least one additional coordinate by determining the circular shift of the first instance of the cyclic main number sequence running perpendicularly to the x-axis or the y-axis in the position code.

41. A computer-readable media having stored thereon program code, which when executed by a processor, causes the processor to carry out a method as claimed in claim 18.

42. A product having a surface, the product being provided with a position code that codes positions on the surface in two dimensions, the positions along an x-axis being coded by a first difference number sequence having the property that each partial sequence of a predetermined length has an unambiguously determined place within the first difference number sequence, each position along the x-axis being coded by one of said partial sequences, the positions along a y-axis being coded by a second difference number sequence having the property that each partial sequence of a predetermined length has an unambiguously determined place within the second difference number sequence, each position along the y-axis being coded by one of said partial sequences, the numbers of the first difference number sequence being coded by differences in circular shifts between instances of a first main number sequence running orthogonally to the first difference number sequence; and the numbers of the second difference number sequence being coded by differences in circular shifts between instances of a second main number sequence running orthogonally to the second difference sequence.

* * * * *